United States Patent
Collart

(10) Patent No.: US 7,499,938 B2
(45) Date of Patent: Mar. 3, 2009

(54) CONTROLLING PLAYBACK OF CONTENT STORED ON A PORTABLE STORAGE MEDIUM

(75) Inventor: Todd Collart, Los Altos, CA (US)

(73) Assignee: Sonic Solutions, A California Corporation, Novato, CA (US)

( * ) Notice: Subject to any disclaimer, the term of this patent is extended or adjusted under 35 U.S.C. 154(b) by 483 days.

(21) Appl. No.: 10/957,033

(22) Filed: Sep. 30, 2004

(65) Prior Publication Data

US 2005/0044481 A1  Feb. 24, 2005

Related U.S. Application Data

(63) Continuation of application No. 09/476,190, filed on Jan. 3, 2000, now Pat. No. 6,944,621, which is a continuation-in-part of application No. 09/296,098, filed on Apr. 21, 1999, now Pat. No. 6,453,420.

(51) Int. Cl.
G06F 7/00 (2006.01)
(52) U.S. Cl. .................... 707/102; 707/10; 707/101
(58) Field of Classification Search .......... 707/102, 707/101, 10
See application file for complete search history.

(56) References Cited

U.S. PATENT DOCUMENTS

| | | | |
|---|---|---|---|
| 4,672,572 A | 6/1987 | Alsberg | |
| 4,709,813 A | 12/1987 | Wildt | |
| 4,710,754 A | 12/1987 | Montean | |
| 4,739,510 A | 4/1988 | Jeffers et al. | |
| 4,785,472 A | 11/1988 | Shapiro | |
| 4,888,638 A | 12/1989 | Bohn | |
| 4,967,185 A | 10/1990 | Montean | |
| 4,993,068 A | 2/1991 | Piosenka et al. | |
| 5,023,907 A | 6/1991 | Johnson et al. | |
| 5,109,482 A | 4/1992 | Bohrman | |
| 5,128,752 A | 7/1992 | Von Kohorn | |
| 5,274,758 A | 12/1993 | Beitel et al. | |
| 5,289,439 A | 2/1994 | Koulopoulos et al. | |
| 5,305,195 A | 4/1994 | Murphy | |
| 5,305,197 A | 4/1994 | Axler et al. | |

(Continued)

FOREIGN PATENT DOCUMENTS

DE  42 42 992 A1  6/1994

(Continued)

OTHER PUBLICATIONS http://www.sonic.com/, as printed in year 2007.*

(Continued)

*Primary Examiner*—David Y Jung
(74) *Attorney, Agent, or Firm*—Fitch, Even, Tabin & Flannery

(57) ABSTRACT

A method of playing multimedia content comprising reading, at a local machine, local multimedia content stored on a portable storage medium; and utilizing a control structure stored on the separate storage medium to alter the playback of the local multimedia content stored on the portable storage medium. A method of providing multimedia content comprising the steps of reading, at a local machine, local multimedia content stored on a portable storage medium; and downloading a control structure to control the display of the local multimedia content.

87 Claims, 7 Drawing Sheets

U.S. PATENT DOCUMENTS

| | | |
|---|---|---|
| 5,347,508 A | 9/1994 | Montbriand et al. |
| 5,353,218 A | 10/1994 | De Lapa et al. |
| 5,400,402 A | 3/1995 | Garfinkle |
| 5,410,343 A | 4/1995 | Coddington et al. |
| 5,413,383 A | 5/1995 | Laurash et al. |
| 5,420,403 A | 5/1995 | Allum et al. |
| 5,426,629 A | 6/1995 | Saitou et al. |
| 5,457,746 A | 10/1995 | Dolphin |
| 5,467,329 A | 11/1995 | Hashimoto |
| 5,483,658 A | 1/1996 | Grube et al. |
| 5,509,074 A | 4/1996 | Choudury et al. |
| 5,530,686 A | 6/1996 | Schylander et al. |
| 5,550,577 A | 8/1996 | Verbiest et al. |
| 5,568,275 A | 10/1996 | Norton et al. |
| 5,617,502 A | 4/1997 | Ort et al. |
| 5,619,024 A | 4/1997 | Kolls |
| 5,619,733 A | 4/1997 | Noe et al. |
| 5,633,946 A | 5/1997 | Lachinski et al. |
| 5,640,453 A | 6/1997 | Schuchman et al. |
| 5,640,560 A | 6/1997 | Smith |
| 5,642,171 A | 6/1997 | Baumgartner et al. |
| 5,651,064 A | 7/1997 | Newell |
| 5,659,792 A | 8/1997 | Walmsley |
| 5,673,195 A | 9/1997 | Schwartz et al. |
| 5,677,953 A | 10/1997 | Dolphin |
| 5,694,546 A | 12/1997 | Reisman |
| 5,696,898 A | 12/1997 | Baker et al. |
| 5,717,879 A | 2/1998 | Moran et al. |
| 5,729,687 A | 3/1998 | Rothrock et al. |
| 5,734,719 A | 3/1998 | Tsevdos et al. |
| 5,734,898 A | 3/1998 | He |
| 5,736,977 A | 4/1998 | Hughes |
| 5,751,672 A | 5/1998 | Yankowski |
| RE35,839 E | 7/1998 | Asai et al. |
| 5,790,753 A | 8/1998 | Krishnamoorthy |
| 5,801,685 A | 9/1998 | Miller et al. |
| 5,802,294 A | 9/1998 | Ludwig et al. |
| 5,804,810 A | 9/1998 | Woolley et al. |
| 5,805,442 A | 9/1998 | Crater et al. |
| 5,805,804 A | 9/1998 | Laursen et al. |
| 5,808,662 A | 9/1998 | Kinney et al. |
| 5,809,250 A | 9/1998 | Kisor |
| 5,809,471 A | 9/1998 | Brodsky |
| 5,812,661 A | 9/1998 | Akiyama et al. |
| 5,818,935 A | 10/1998 | Maa |
| 5,819,284 A | 10/1998 | Farber |
| 5,822,123 A | 10/1998 | Davis et al. |
| 5,822,291 A | 10/1998 | Brindze et al. |
| 5,825,876 A | 10/1998 | Peterson, Jr. |
| 5,850,218 A | 12/1998 | LaJolie et al. |
| 5,857,021 A | 1/1999 | Kataoka et al. |
| 5,860,068 A | 1/1999 | Cook |
| 5,869,819 A | 2/1999 | Knowles et al. |
| 5,872,747 A | 2/1999 | Johnson |
| 5,875,296 A | 2/1999 | Shi et al. |
| 5,878,020 A | 3/1999 | Takahashi |
| 5,878,233 A | 3/1999 | Schloss |
| 5,882,291 A | 3/1999 | Bradshaw et al. |
| 5,883,623 A | 3/1999 | Cseri |
| 5,887,143 A | 3/1999 | Saito et al. |
| 5,889,980 A | 3/1999 | Smith, Jr. |
| 5,892,825 A | 4/1999 | Mages et al. |
| 5,892,900 A | 4/1999 | Ginter et al. |
| 5,892,908 A | 4/1999 | Hughes et al. |
| 5,893,910 A | 4/1999 | Martineau et al. |
| 5,895,073 A | 4/1999 | Moore |
| 5,896,132 A | 4/1999 | Berstis et al. |
| 5,899,980 A | 5/1999 | Wilf et al. |
| 5,907,322 A | 5/1999 | Kelly et al. |
| 5,907,704 A | 5/1999 | Gudmundson et al. |
| 5,909,551 A | 6/1999 | Tahara et al. |
| 5,913,210 A | 6/1999 | Call |
| 5,915,093 A | 6/1999 | Berlin et al. |
| 5,920,694 A | 7/1999 | Carleton et al. |
| 5,922,045 A | 7/1999 | Hanson |
| 5,924,013 A | 7/1999 | Guido et al. |
| 5,930,238 A | 7/1999 | Nguyen |
| 5,930,767 A | 7/1999 | Reber et al. |
| 5,931,906 A | 8/1999 | Fidelibus et al. |
| 5,933,497 A | 8/1999 | Beetcher et al. |
| 5,940,504 A | 8/1999 | Griswold |
| 5,943,304 A | 8/1999 | Kamada et al. |
| 5,945,988 A | 8/1999 | Williams et al. |
| 5,950,173 A | 9/1999 | Perkowski |
| 5,956,482 A | 9/1999 | Agraharam et al. |
| 5,960,398 A | 9/1999 | Fuchigami et al. |
| 5,969,898 A | 10/1999 | Hansen et al. |
| 5,977,964 A | 11/1999 | Williams et al. |
| 5,978,773 A | 11/1999 | Hudetz et al. |
| 5,986,690 A | 11/1999 | Hendricks |
| 5,987,454 A | 11/1999 | Hobbs |
| 5,987,525 A | 11/1999 | Roberts et al. |
| 5,991,374 A | 11/1999 | Hazenfield |
| 5,991,399 A | 11/1999 | Graunke et al. |
| 5,991,798 A | 11/1999 | Ozaki et al. |
| 5,995,965 A | 11/1999 | Experton |
| 6,006,328 A | 12/1999 | Drake |
| 6,009,410 A | 12/1999 | LeMole et al. |
| 6,012,071 A | 1/2000 | Krishna et al. |
| 6,016,166 A | 1/2000 | Huang et al. |
| 6,018,768 A | 1/2000 | Ullman et al. |
| 6,021,307 A | 2/2000 | Chan |
| 6,023,241 A | 2/2000 | Clapper |
| 6,034,937 A | 3/2000 | Kumagai |
| 6,035,329 A | 3/2000 | Mages et al. |
| 6,044,403 A | 3/2000 | Gerszberg et al. |
| 6,047,292 A | 4/2000 | Kelly et al. |
| 6,052,717 A | 4/2000 | Reynolds |
| 6,052,785 A | 4/2000 | Lin et al. |
| 6,055,314 A | 4/2000 | Spies et al. |
| 6,061,057 A | 5/2000 | Knowlton et al. |
| 6,064,979 A | 5/2000 | Perkowski |
| 6,073,124 A | 6/2000 | Krishnan et al. |
| 6,076,733 A | 6/2000 | Wilz, Sr. et al. |
| 6,078,348 A | 6/2000 | Klosterman et al. |
| 6,080,207 A | 6/2000 | Kroening et al. |
| 6,081,785 A | 6/2000 | Oshima et al. |
| 6,083,276 A | 7/2000 | Davidson et al. |
| 6,097,291 A | 8/2000 | Tsai et al. |
| 6,097,814 A | 8/2000 | Mochizuki |
| 6,101,180 A | 8/2000 | Donahue et al. |
| 6,101,534 A | 8/2000 | Rothschild |
| 6,108,002 A | 8/2000 | Ishizaki |
| 6,108,687 A | 8/2000 | Craig |
| 6,119,147 A | 9/2000 | Toomey et al. |
| 6,124,854 A | 9/2000 | Sartain et al. |
| 6,125,388 A | 9/2000 | Reisman |
| 6,128,649 A | 10/2000 | Smith et al. |
| 6,128,652 A | 10/2000 | Toh et al. |
| 6,134,533 A | 10/2000 | Shell |
| 6,134,593 A | 10/2000 | Alexander et al. |
| 6,138,150 A | 10/2000 | Nichols et al. |
| 6,141,010 A | 10/2000 | Hoyle |
| 6,145,006 A | 11/2000 | Vishlitsky et al. |
| 6,154,738 A | 11/2000 | Call |
| 6,154,773 A | 11/2000 | Roberts et al. |
| 6,154,844 A | 11/2000 | Touboul et al. |
| 6,157,953 A | 12/2000 | Chang |
| 6,161,132 A | 12/2000 | Roberts et al. |
| 6,175,842 B1 | 1/2001 | Kirk et al. |
| 6,175,872 B1 | 1/2001 | Neumann et al. |
| 6,182,222 B1 | 1/2001 | Oparaji |
| 6,184,877 B1 | 2/2001 | Dodson et al. |
| 6,189,032 B1 | 2/2001 | Susaki et al. |

| | | | | | | |
|---|---|---|---|---|---|---|
| 6,192,340 B1 | 2/2001 | Abecassis | | 6,698,020 B1 | 2/2004 | Zigmond et al. |
| 6,195,693 B1 | 2/2001 | Berry et al. | | 6,721,748 B1 | 4/2004 | Knight et al. |
| 6,199,048 B1 | 3/2001 | Hudetz et al. | | 6,725,281 B1 | 4/2004 | Zintel et al. |
| 6,202,061 B1 | 3/2001 | Khosla et al. | | 6,731,239 B2 | 5/2004 | Wall et al. |
| 6,208,805 B1 | 3/2001 | Abecassis | | 6,732,162 B1 | 5/2004 | Wood et al. |
| 6,219,675 B1 | 4/2001 | Pal et al. | | 6,741,790 B1 | 5/2004 | Burgess |
| 6,226,235 B1 | 5/2001 | Wehmeyer | | 6,760,043 B2 | 7/2004 | Markel |
| 6,229,523 B1 | 5/2001 | Czako | | 6,769,130 B1 | 7/2004 | Getsin |
| 6,230,174 B1 | 5/2001 | Berger et al. | | 6,771,290 B1 | 8/2004 | Hoyle |
| 6,230,324 B1 | 5/2001 | Tomita et al. | | 6,803,950 B2 | 10/2004 | Goldschimdt et al. |
| 6,233,618 B1 | 5/2001 | Shannon | | 6,865,746 B1 | 3/2005 | Herrington et al. |
| 6,233,736 B1 | 5/2001 | Wolzien | | 6,868,225 B1 | 3/2005 | Brown |
| 6,239,793 B1 | 5/2001 | Barnert et al. | | 6,941,383 B1 | 9/2005 | Getsin et al. |
| 6,239,801 B1 | 5/2001 | Chiu et al. | | 6,944,621 B1 | 9/2005 | Collart |
| 6,240,459 B1 | 5/2001 | Roberts et al. | | 6,952,697 B1 | 10/2005 | Rothschild |
| 6,240,555 B1 | 5/2001 | Shoff et al. | | 6,959,339 B1 | 10/2005 | Wu et al. |
| 6,243,692 B1 | 6/2001 | Floyd et al. | | 6,976,229 B1 | 12/2005 | Balabanovic et al. |
| 6,246,778 B1 | 6/2001 | Moore | | 7,024,497 B1 | 4/2006 | Maffezoni |
| 6,259,701 B1 | 7/2001 | Shur et al. | | 7,043,693 B2 | 5/2006 | Wenzel et al. |
| 6,263,501 B1 | 7/2001 | Schein et al. | | 7,136,574 B2 | 11/2006 | Ando et al. |
| 6,263,505 B1 | 7/2001 | Walker et al. | | 7,165,071 B2 | 1/2007 | Fanning et al. |
| 6,282,713 B1 | 8/2001 | Kitsukawa et al. | | 7,165,098 B1 | 1/2007 | Boyer et al. |
| 6,289,165 B1 | 9/2001 | Abecassis | | 7,168,012 B2 | 1/2007 | Clauss |
| 6,298,482 B1 | 10/2001 | Seidman et al. | | 7,171,480 B2 | 1/2007 | Chatani |
| 6,301,661 B1 | 10/2001 | Shambroom | | 2001/0001160 A1 | 5/2001 | Shoff |
| 6,308,005 B1 | 10/2001 | Ando et al. | | 2001/0005903 A1 | 6/2001 | Goldschmidt Iki et al. |
| 6,321,252 B1 | 11/2001 | Bhola et al. | | 2001/0056434 A1 | 12/2001 | Kaplan et al. |
| 6,331,865 B1 | 12/2001 | Sachs et al. | | 2001/0056478 A1 | 12/2001 | Wheeler et al. |
| 6,341,375 B1 | 1/2002 | Watkins | | 2002/0026321 A1 | 2/2002 | Faris et al. |
| 6,360,057 B1 | 3/2002 | Tsumagari et al. | | 2002/0049978 A1 | 4/2002 | Rodriguez et al. |
| 6,374,402 B1 | 4/2002 | Schmeidler et al. | | 2002/0056129 A1 | 5/2002 | Blackketter et al. |
| 6,381,404 B1 | 4/2002 | deCarmo | | 2002/0057893 A1 | 5/2002 | Wood et al. |
| 6,388,714 B1 | 5/2002 | Schein et al. | | 2002/0073152 A1 | 6/2002 | Andrew et al. |
| 6,389,467 B1 | 5/2002 | Eyal | | 2002/0078144 A1 | 6/2002 | Lamkin et al. |
| 6,389,473 B1 | 5/2002 | Carmel et al. | | 2002/0083377 A1 | 6/2002 | Clauss et al. |
| 6,405,203 B1 | 6/2002 | Collart | | 2002/0088011 A1 | 7/2002 | Lamkin et al. |
| 6,415,438 B1 | 7/2002 | Blackketter et al. | | 2002/0103855 A1 | 8/2002 | Chatani |
| 6,418,471 B1 | 7/2002 | Shelton et al. | | 2002/0143774 A1 | 10/2002 | Vandersluis |
| 6,426,778 B1 | 7/2002 | Valdez | | 2002/0184627 A1 | 12/2002 | Alba et al. |
| 6,449,653 B2 | 9/2002 | Klemets et al. | | 2003/0005461 A1 | 1/2003 | Shinohara |
| 6,452,609 B1 | 9/2002 | Katinsky et al. | | 2003/0028892 A1 | 2/2003 | Gewickey et al. |
| 6,453,420 B1 | 9/2002 | Collart | | 2003/0101232 A1 | 5/2003 | Ullman et al. |
| 6,453,459 B1 | 9/2002 | Brodersen et al. | | 2003/0204847 A1 | 10/2003 | Ellis et al. |
| 6,460,086 B1 | 10/2002 | Swaminathan et al. | | 2004/0010510 A1 | 1/2004 | Hotti |
| 6,460,180 B1 | 10/2002 | Park et al. | | 2004/0024889 A1 | 2/2004 | Getsin |
| 6,462,754 B1 | 10/2002 | Chakraborty et al. | | 2004/0040042 A1 | 2/2004 | Feinleib |
| 6,463,468 B1 | 10/2002 | Buch et al. | | 2004/0139077 A1 | 7/2004 | Banker |
| 6,486,891 B1 | 11/2002 | Rice | | 2004/0215755 A1 | 10/2004 | Oneill |
| 6,499,057 B1 | 12/2002 | Portuesi | | 2004/0220791 A1 | 11/2004 | Lamkin |
| 6,505,160 B1 | 1/2003 | Levy et al. | | 2004/0220926 A1 | 11/2004 | Lamkin |
| 6,505,169 B1 | 1/2003 | Bhagavath et al. | | 2004/0244041 A1 | 12/2004 | Collart |
| 6,510,467 B1 | 1/2003 | Behfar et al. | | 2004/0255236 A1 | 12/2004 | Getsin |
| 6,516,467 B1 | 2/2003 | Schindler et al. | | 2005/0041150 A1 | 2/2005 | Gewickey |
| 6,523,063 B1 | 2/2003 | Miller et al. | | 2005/0050208 A1 | 3/2005 | Chatani |
| 6,526,580 B2 | 2/2003 | Shimomura et al. | | 2005/0154682 A1 | 7/2005 | Taylor |
| 6,529,949 B1 | 3/2003 | Getsin et al. | | 2005/0166232 A1 | 7/2005 | Lamkin |
| 6,535,909 B1 | 3/2003 | Rust | | 2005/0182828 A1 | 8/2005 | Lamkin |
| 6,543,053 B1 | 4/2003 | Li et al. | | 2005/0193322 A1 | 9/2005 | Lamkin |
| 6,564,255 B1 | 5/2003 | Mobini et al. | | 2005/0198574 A1 | 9/2005 | Lamkin |
| 6,567,980 B1 | 5/2003 | Jain et al. | | 2005/0223013 A1 | 10/2005 | Jarman |
| 6,573,907 B1 | 6/2003 | Madrane | | 2005/0240588 A1 | 10/2005 | Siegel et al. |
| 6,580,870 B1 | 6/2003 | Kanazawa et al. | | 2005/0251732 A1 | 11/2005 | Lamkin |
| 6,591,420 B1 | 7/2003 | McPherson et al. | | 2005/0251749 A1 | 11/2005 | Lamkin |
| 6,601,103 B1 | 7/2003 | Goldschmidt et al. | | 2005/0265701 A1 | 12/2005 | Lamkin et al. |
| 6,609,253 B1 | 8/2003 | Swix et al. | | 2005/0278435 A1 | 12/2005 | Lamkin et al. |
| 6,615,408 B1 | 9/2003 | Kaiser et al. | | 2005/0278729 A1 | 12/2005 | Lamkin et al. |
| 6,625,656 B2 | 9/2003 | Goldhor et al. | | 2006/0004778 A1 | 1/2006 | Lamkin et al. |
| 6,636,888 B1 | 10/2003 | Bookspan et al. | | 2006/0041639 A1 | 2/2006 | Lamkin |
| 6,640,337 B1 | 10/2003 | Lu | | 2006/0041640 A1 | 2/2006 | Lamkin |
| 6,659,861 B1 | 12/2003 | Faris et al. | | 2006/0107215 A1 | 5/2006 | Gewickey |
| 6,691,106 B1 | 2/2004 | Sathyanarayan | | 2006/0112336 A1 | 5/2006 | Gewickey |
| 6,691,126 B1 | 2/2004 | Syeda-Mahmood | | 2006/0117344 A1 | 6/2006 | Lamkin |
| 6,694,309 B2 | 2/2004 | Cho et al. | | 2006/0159109 A1 | 7/2006 | Lamkin |

| | | | |
|---|---|---|---|
| 2006/0161635 | A1 | 7/2006 | Lamkin |
| 2006/0181965 | A1 | 8/2006 | Collart |
| 2006/0182424 | A1 | 8/2006 | Lamkin et al. |
| 2006/0184538 | A1 | 8/2006 | Randall |
| 2006/0193606 | A1 | 8/2006 | Lamkin |
| 2006/0195600 | A1 | 8/2006 | Getsin |
| 2007/0094583 | A1 | 4/2007 | Randall |

FOREIGN PATENT DOCUMENTS

| | | |
|---|---|---|
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 A2 | 3/1998 |
| JP | 11039262 A2 | 2/1999 |
| JP | 2000236531 | 8/2000 |
| WO | WO 98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS http://www.interactual.com/, as printed in year 2007.*
Tracking and mitigating piracy Mingji Lou; Jonckheere, J.A.; American Control Conference, 2006 Jun. 14-16, 2006 p. 6 pp.*
Online Remote Controllability Verification via Internet and Dial-up Network for DVD Recorder Based on Virtual Instrument Technology; Wang Jizhou; Liu Hongbo; Yu Liang; Sun Rihe; Electronic Measurement and Instruments, 2007. ICEMI '07. 8th International Conference on Aug. 16, 2007-Jul. 18, 2007 pp. 3-108-3-112.*
Economics of technology standards: implications for offline movie piracy in a global context; Chellappa, R.K.; Shivendu, S.; System Sciences, 2003. Proceedings of the 36th Annual Hawaii International Conference on Jan. 6-9, 2003 p. 10 pp.*
Adams et al., "Distributed Research Terms: Meeting Asynchronously in Virtual Space" FX Palo Alto Laboratory, Inc. JCMC, Jun. 1999.
Manohar et al., "Replay by Re-execution: a Paradigm for Asynchronous Collaboration via Record and Replay of of Interactive Multimedia Sessions" SIGOIS Bulletin, Dec. 1994.
Minneman et al., "A Confederation of Tools for Capturing and Accessing Collaborative Activity" ACM Multimedia 95-Electronic Proceedings, Nov. 1995.
U.S. Appl. No. 09/649,215, filed Aug. 28, 2000, Lamkin.
U.S. Appl. No. 09/476,190, filed Jan. 3, 2000, Collart.
U.S. Appl. No. 09/488,345, filed Jan. 20, 2000, Collart.
U.S. Appl. No. 09/488,337, filed Jan. 20, 2000, Getsin.
U.S. Appl. No. 09/488,155, filed Jan. 20, 2000, Getsin.
U.S. Appl. No. 09/489,600, filed Jan. 20, 2000, Getsin.
U.S. Appl. No. 09/488,614, filed Jan. 20, 2000, Getsin.
U.S. Appl. No. 09/489,601, filed Jan. 20, 2000, Getsin.
U.S. Appl. No. 09/489,597, filed Jan. 20, 2000, Getsin.
U.S. Appl. No. 09/489,596, filed Jan. 20, 2000, Collart.
E Media Professional Reviews, NSM Galaxy Jukebox, by David Doering, Emedia Professional, Apr. 1999, (p. 78-80), http://www.emediapro.com/EM1999/doering4.html.
"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) 267-272.

"Active Video Watching Using Annotation," by Nuno Correia and Teresa Chambel, ACM Digital Library, International Multimedia Conference, Oct. 30-Nov. 5, 1999, in Orlando, Florida.
"No Modem Needed: TV Signals Bring the Web to Your PC," by Michael S. Lasky, Computing Storypage, CNN IDG.net, May 19, 1998.
"All About DIVX, Where the Facts are Told and the Decision is Yours!" Webmaster's Note Jan. 26, 1999, http://www.prodivx.com.
Advanced Television Enhancement Forum Specification (ATVEF), Comment Draft Version 1.0r1, 1-20 copy of printout from web site Http://www.atvef.com/atvef_spec/TVE-public.htm (Oct. 18, 1998).
MBONE Multicasting Tomorrow's Internet, Request for Comments (RFC) 1112 and 1458, Appendices A and B, Copyright 1996, 1998.
Abstract of "MBone Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net/gaztec/gaztec15.htm, posted Sep. 7, 1998, vol. II, No. 13.
"When Signed, Sealed, Delivered, It's Yours," by Precision Marketing, p. 30(1), Jul. 21, 1997.
http://www.spinware.net/portanet/portanet.html, printed on Jan. 8, 2003.
Abstract of Edgar Weippl's, "An Approach to Role-Based Access Control for Digital Content," 2001, IEEE, pp. 290-294.
Henry M. Gladney, "Safeguarding Digital Library Contents and Users: Document Access Control," Dlib Magazine, http://www.dlib.org/dlib/june97/ibm/06gladdney.html, Jun. 1997.
"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.
"CyberMedia Secures Major Licensing Agreement With Sony for Oil Change Software," http://www.cypbermedia.com/company/pr/sony.html, Nov. 26, 2001.
MarketScape's WebCD Pro Publisher, Ron Gustavson, Emedia Professional, Dec. 1997, http://www.emedialive.com/awards/award11.html.
"Hybrid CD-ROM/Online Titles Will Surge in 1996," DCD Business, Apr. 1996, http://www.tapediscbusiness.com/issues/1996/0496/apr_index.html.
PC Magazine, "Trends Online: Intel's Internet Plans: Hybrid Applications", Jul. 24, 1996.
"Internet tool triggers audio CDs," by Cate C. Corcoran, Jul. 24, 1995, http://www.access.ch/power/infoservices/MacWeek/MacWeek240795.html.
"MarketScape(R) WebCD(TM) 1.0 Bypasses Internet Bottlenecks," DialogWeb, Aug. 26, 1996.
"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.
"CD-ROM/Online Hybrids, The Missing Link?", by Richard R. Reisman, CD-ROM Professional, vol. 8, No. 4, Apr. 1995, http://www.teleshuttle.com/cdpart.htm.
Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuff.html.
"Oil Change software hunts down upgrades," by Bary Cooper, The Orlando Sentinel, Web-Posted Oct. 30, 1996, The Augusta Chronicle Online, http://www.augustachronicle.com/headlines/103196/oil_change.html.
Player 2.0 Product Description, Copyright 1995-2000, InterActual Technologies.
Resource Guide on Distributed Media: Local/CD-ROM/Online/Web, updated Nov. 25, 1996, Richard R. Reisman, President, Teleshuttle, http://www.teleshuttle.com/resource.
"Topic is Veritably Everywhere: CD-ROM, the Web, Intranets, etc.," Seybold Report on Desktop Publishing, vol. 10, No. 7, Copyright 1996 by Seybold Publications Inc.

"Spin Webs around a CD-ROM: The Next Generation of CD/Web Hybrids," Richard R. Reisman, President, Teleshuttle Corporation, Mass High Tech, Sep. 2, 1996, http://www.teleshuttle.com/nextgen.htm.

"Update Your Software While You Sleep," Edited by Paul M. Eng, Bits & Bytes, BusinessWeek, Updated Jun. 17, 1996, http://www.businessweek.com/1996/25/b3480140.htm.

"Verity smooths Net searches," by CNET News.com Staff. Tech News—CNET.com, Feb. 20, 1996.

"Video and Audio: Organization and Retrieval in the WWW", White Paper. (1996) http://vosaic.com/corp/papers/www5.html. Http://citeseer.nj.nec.com/chen96video.html.

"Web/CD-ROM hybrids; A working definition," site established Oct. 2, 1998, http://www.philb.com/webcd.htm.

Who's Who Hybrid Internet/CD-ROM Magazine/Catalog, Google cache Nov. 26, 2001, http://www.ecatcorp.com/alpha/mci.htm.

WebCD, Internet Posting, Roger Clarke, Dec. 1, 1996, http://www.anu.edu.au/people/Roger.Clarke/II/WebCD.html.

Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.

Re: WebCD, Internet Posting, Liddy Nevile, Dec. 2, 1996, http://www.anu.edu.au/mail-archives/link/link9612/0010.html.

Re: WebCD, Internet Posting, Rachel Polanskis, Dec. 2, 1996, http://www.anu.edu.au/mail-archives/link/link9612/0013.html.

Re: WebCD, Internet Posting, Ron Ipsen, Dec. 1, 1996, http://www.anu.edu.au/mail-archives/link/link9612/0006.html.

www.techdirt.com/articles/20030516/1358202.shtml, May 16, 2003.

www.techdirt.com/articles/990616/1020235_F.shtml, Jun. 16, 2003.

"MultiSync: A Synchronization Model for Multimedia Systems," IEEE Journal On Selected Areas in Communications, vol. 14, No. 1, Jan. 1996, pp. 238-248.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, consumer Electronics, 2002, IEEE, 2002 Digest of Technical Papers, International Conference on Jun. 18-20, 2002, pp. 264-265.

"World-Wide Web: a distributed paradigm for global hetworking"; Heylighen, F., Proceeding Share Europe Spring Conference; pp. 355-368; Apr. 18, 1994.

"A Simplified and an Efficient Packet Level Internet Access Control Scheme"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/~duguid/wirecdlk/html.

"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.

"Voyager CDLink Turns Audio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired.com/wired/archive/4.05/net_surf.html.

"Voyager CDLink (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref.html on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; Newmedia, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLs", available at http://archive.ncsa.uiuc.edu/demoweb/url-primer.html.

"Naming and Addressing: URls, URLs, . . . " Printed Mar. 17, 2004, available at http://www.w3.org/Addressing/.

"Software Distribution by CD-ROM Linked with Network," IBM Technical Dislcosure Bulletin, vol. 38, No. 11, Nov. 1, 1995, pp. 111-112.

Office Action from 09489601 dated Oct. 4, 2007 (68624).

Examiner's Answer to Appeal Brief from 09489597 dated Feb. 25, 2008 (68625).

Office Action from 09489596 dated Mar. 6, 2008 (68626).

Notice of Allowance from 09898479 dated Oct. 3, 2007 (70681).

Notice of Allowance from 10190307 dated Feb. 22, 2008 (73532).

Office Action from 10860351 dated Feb. 29, 2008 (81173).

Office Action from 10860350 dated Oct. 17, 2007 (81296).

Office Action from 10860350 dated Feb. 19, 2008 (81296).

Office Action from 10123816 dated Nov. 14, 2007 (81315).

Office Action from 10957377 dated Mar. 18, 2008 (81395).

Office Action from 11060638 dated May 16, 2007 (81405).

Office Action from 11060638 dated Nov. 13, 2007 (81405).

Office Action from 11136627 dated Feb. 29, 2008 (81477).

Notice of Allowance from 11154092 dated Sep. 21, 2007 (86601).

Notice of Allowance from 11154092 dated Jan. 24, 2008 (86601).

Office Action from 11278402 dated Dec. 10, 2007 (86730).

Office Action from 11278401 dated Jan. 18, 2008 (86732).

"Compact Disc" Wikipedia.org, http://en.wikipedia.org/wiki/Compact_Disc.

Osta, et al., "CD-R &CD-RW Questions & Answers" *OSTA-4 Revision 2.00* Jul. 15, 1997.

"Rainbow Technologies Announces SentinelExpress 2.0 for Software Purchasing and Activation Over the Internet"; *Business Wire*, Nov. 17, 1998.

Patel, P.; "E-Database, XML: Extensible Markup Language"; *Database Programming & Design* Jul. 1998.

Esposito, D.; "Introduction to XML"; *DNJ Online*, Jul. 1999.

Curtin, M.; "PCFriendly Enables DVD Backchannels", *Interhack*, Feb. 2002.

*International Preliminary Report on Patentabiltiy*; PCT/US2005/045521 (86673pct); issued Jun. 26, 2007.

Office Action from 11134756 dated Apr. 16, 2008 (81499).

Office Action from 111324091 dated Mar. 11, 2008 (86699).

Office Action from 11323406 dated Apr. 14, 2008 (86700).

"Tivo FAQ", Internet Wayback Machine, archive.org, Aug. 15, 2000.

Jasco, P. et al., "Real-Time Audio Is Now Online for Real", Multimedia Medley, Mar. 1996.

Office Action, "from U.S. Appl. No. 11/154,092 (86601) dated May 14, 2007 explaining JP2000236531".

Office Action from 09476190 dated Sep. 15, 2003 (68616).

Office Action from 09476190 dated Oct. 1, 2002(68616).

Office Action from 09488155 dated Jan. 21, 2004 (68621).

Office Action from 09488155 dated Jul. 2, 2003 (68621).

Office Action from 09488155 dated Jul. 3, 2001 (68621).

Advisory Action from 09488614 dated May 20, 2005 (68623).

Office Action from 09488614 dated Jan. 12, 2005 (68623).

Office Action from 09488614 dated Mar. 15, 2006 (68623).

Office Action from 09488614 dated Mar. 29, 2004 (68623).

Office Action from 09488614 dated Oct. 5, 2006 (68623).

Advisory Action from 09489601 dated Feb. 8, 2005 (68624).

Office Action from 09489601 dated Jan. 30, 2004 (68624).

Office Action from 09489601 dated Apr. 13, 2007 (68624).

Office Action from 09489601 dated Apr. 27, 2006 (68624).

Office Action from 09489601 dated Jun. 2, 2005 (68624).

Office Action from 09489601 dated Jul. 9, 2004 (68624).

Office Action from 09489601 dated Oct. 20, 2004 (68624).

Office Action from 09489601 dated Nov. 15, 2005 (68624).

Advisory Action from 09489597 dated Jan. 17, 2006 (68625).

Office Action from 09489597 dated Apr. 5, 2005 (68625).

Office Action from 09489597 dated May 1, 2006 (68625).
Office Action from 09489597 dated Jul. 27, 2004 (68625).
Office Action from 09489597 dated Oct. 18, 2005 (68625).
Office Action from 09489597 dated Oct. 18, 2006 (68625).
Office Action from 09489597 dated Dec. 5, 2003 (68625).
Advisory Action from 09489596 dated Dec. 27, 2006 (68626).
Office Action from 09489596 dated Feb. 11, 2004 (68626).
Office Action from 09489596 dated Jun. 14, 2006 (68626).
Office Action from 09489596 dated Jun. 30, 2005 (68626).
Office Action from 09489596 dated Jul. 8, 2003 (68626).
Office Action from 09489596 dated Aug. 2, 2004 (68626).
Office Action from 09489596 dated Sep. 13, 2006 (68626).
Office Action from 09489596 dated Oct. 3, 2002(68626).
Office Action from 09489596 dated Dec. 14, 2004 (68626).
Office Action from 09489596 dated Dec. 29, 2005 (68626).
Office Action from 09499247 dated Jul. 3, 2001 (68627).
Advisory Action from 09898479 dated Jan. 5, 2007 (70681).
Office Action from 09898479 dated Apr. 19, 2007 (70681).
Office Action from 09898479 dated Apr. 20, 2006 (70681).
Office Action from 09898479 dated Oct. 3, 2006 (70681).
Office Action from 09898479 dated Nov. 9, 2005 (70681).
Notice of Allowance from 09935756 dated Jun. 29, 2006 (71714).
Notice of Allowance from 09935756 dated Sep. 18, 2006 (71714).
Office Action from 09935756 dated Feb. 14, 2005 (71714).
Office Action from 09935756 dated Jul. 25, 2005 (71714).
Notice of Allowance from 10190307 dated Jun. 6, 2007 (73532).
Office Action from 10190307 dated Jan. 18, 2007 (73532).
Office Action from 10190307 dated Mar. 16, 2006 (73532).
Office Action from 10190307 dated Jul. 31, 2006 (73532).
Office Action from 10860351 dated Feb. 7, 2007(81173).
Notice of Allowance from 10346726 dated Mar. 12, 2007 (81049).
Office Action from 10860350 dated Apr. 3, 2007 (81296).
Advisory Action from 10880272 dated Jun. 2, 2006 (81336).
Office Action from 10880272 dated Jan. 24, 2007 (81336).
Office Action from 10880272 dated Apr. 4, 2006 (81336).
Office Action from 10880272 dated Jul. 10, 2007 (81336).
Office Action from 10880272 dated Dec. 29, 2005 (81336).
Office Action from 11060638 dated Jul. 5, 2007 (81405).
Office Action from 11154092 dated May 14, 2007 (86601).
PCT/US05/45521 International Search Report Dated Jun. 5, 2007 (86673PC).
Advisory Action from 09476190 dated Jun. 17, 2002 (68616).
Interview Summary from 09476190 dated Dec. 9, 2003 (68616).
Office Action from 09476190 dated Feb. 17, 2005 (68616).
Office Action from 09476190 dated Mar. 22, 2004 (68616).
Notice of Allowance from 09488613 dated Jan. 13, 2004 (68620).
Office Action from 09488613 dated Jun. 5, 2003 (68620).
Office Action from 09488613 dated Jun. 17, 2004 (68620).
Notice of Allowance from 09499247 dated Oct. 1, 2002 (68627).
Office Action from 09499247 dated Apr. 26, 2002 (68627).
Advisory Action from 09649215 dated Nov. 19, 2003 (68570).
Interview Summary from 09649215 dated Feb. 13, 2004 (68570).
Interview Summary from 09649215 dated May 25, 2004 (68570).
Interview Summary from 09649215 dated Aug. 15, 2005 (68570).
Interview Summary from 09649215 dated Sep. 28, 2006 (68570).
Interview Summary from 09488337 dated Aug. 5, 2003 (68618).
Advisory Action from 09489600 dated Mar. 4, 2004 (68622).
Notice of Allowance from 09489600 dated May 31, 2005 (68622).
Interview Summary from 09489601 dated Dec. 29, 2004 (68624).

Interview Summary from 09489597 dated Sep. 8, 2004 (68625).
Interview Summary from 09489597 dated Oct. 18, 2005 (68625).
Interview Summary from 09489597 dated Oct. 18, 2006 (68625).
Notice of Allowance from 09935756 dated Oct. 2, 2006 (71714).
Advisory Action from 09489596 dated Sep. 21, 2005 (68626).
Interview Summary from 09488614 dated Jul. 27, 2005 (68623).
Office Action from 10880272 dated Jun. 30, 2005 (81336).
Office Action from 09295856 dated Mar. 23, 2000 (68590).
Office Action from 09295856 dated Apr. 9, 2001 (68590).
Office Action from 09295856 dated Nov. 9, 2001 (68590).
Office Action from 09295856 dated Dec. 11, 2000 (68590).
Office Action from 09296202 dated Nov. 1, 2001 (68610).
Office Action from 09295964 dated Jun. 6, 2001 (68613).
Office Action from 09295964 dated Dec. 22, 2000 (68613).
Office Action from 09488143 dated May 22, 2001 (68619).
Office Action from 09488143 dated Dec. 14, 2000 (68619).
"http://www.virtualtourguide.net, "Self-Guided Tour of Yellowstone"", *Virtual Tour Guide, LLC*, first printed Jul. 3, 2007, 3 pages.
Office Action from 09649215 dated Feb. 13, 2004 (68570).
Office Action from 09649215 dated Mar. 28, 2006 (68570).
Office Action from 09649215 dated Apr. 4, 2003 (68570).
Office Action from 09649215 dated Apr. 21, 2005 (68570).
Office Action from 09649215 dated Aug. 16, 2004 (68570).
Office Action from 09649215 dated Aug. 26, 2003 (68570).
Office Action from 09649215 dated Sep. 28, 2006 (68570).
Office Action from 09649215 dated Oct. 17, 2005 (68570).
Notice of Allowance from 09476190 dated Feb. 25, 2004 (68616).
Office Action from 09476190 dated Mar. 25, 2003 (68616).
Office Action from 09476190 dated Apr. 10, 2002 (68616).
Office Action from 09476190 dated Jun. 17, 2002 (68616).
Office Action from 09476190 dated Aug. 27, 2001 (68616).
Office Action from 09488345 dated Mar. 29, 2004 (68617).
Advisory Action from 09488337 dated Jul. 29, 2004 (68618).
Advisory Action from 09488337 dated Aug. 21, 2003 (68618).
Advisory Action from 09488337 dated Aug. 24, 2006 (68618).
Examiner Answer to Appeal Brief from 09488337 dated Apr. 18, 2007 (68618).
Office Action from 09488337 dated Jan. 15, 2003 (68618).
Office Action from 09488337 dated Feb. 14, 2006 (68618).
Office Action from 09488337 dated Mar. 4, 2004 (68618).
Office Action from 09488337 dated May 6, 2005 (68618).
Office Action from 09488337 dated May 29, 2003 (68618).
Office Action from 09488337 dated Jun. 1, 2006 (68618).
Office Action from 09488337 dated Oct. 19, 2005 (68618).
Office Action from 09488337 dated Oct. 21, 2004 (68618).
Office Action from 09488337 dated Oct. 24, 2003 (68618).
Notice of Allowance from 09489600 dated Aug. 2, 2006 (68620).
Notice of Allowance from 09489600 dated Sep. 7, 2006 (68620).
Notice of Allowance from 09489600 dated Oct. 24, 2006 (68620).
Office Action from 09489600 dated Mar. 2, 2005 (68620).
Office Action from 09489600 dated Jun. 17, 2003 (68620).
Office Action from 09489600 dated Jul. 29, 2004 (68620).
Office Action from 09489600 dated Nov. 14, 2003 (68620).
Office Action from 09489600 dated Dec. 3, 2002 (68620).
Advisory Action from 09488155 dated Apr. 15, 2004 (68621).
Notice of Allowance from 09488155 dated Oct. 13, 2004 (68621).

* cited by examiner

CONTROLLING PLAYBACK OF CONTENT STORED ON A PORTABLE STORAGE MEDIUM

RELATED APPLICATIONS

This application is a Continuation of U.S. patent application Ser. No. 09/476,190, filed Jan. 3, 2000, entitled A SYSTEM, METHOD AND ARTICLE OF MANUFACTURE FOR UPDATING CONTENT STORED ON A PORTABLE STORAGE MEDIUM, which is a Continuation in Part of U.S. patent application Ser. No. 09/296,098, filed Apr. 21, 1999, entitled A SYSTEM, METHOD AND ARTICLE OF MANUFACTURE FOR UPDATING CONTENT STORED ON A PORTABLE STORAGE MEDIUM, now U.S. Pat. No. 6,453,420, all of which references are incorporated herein by reference in their entirety.

FIELD OF THE INVENTION

The present invention relates to portable storage mediums and more particularly to portable storage mediums with content that is updated after manufacture.

BACKGROUND OF THE INVENTION

Optical disk storage technologies store information as a series of microscopic pits and smooth areas arranged in tracks on a surface of an annular disk. The stored information is read from the disk by directing a focused laser beam along the tracks and detecting variations in the intensity of the laser beam as it reflects off of the microscopic pits and smooth areas on the disk.

A digital versatile disk (DVD) is a type of optical storage medium that is becoming more and more widely available. DVD's may be used to hold video, audio, and computer data. Currently, DVD formats include: DVD-Video for holding video programs, DVD-ROM for holding computer data, and DVD-Audio for holding audio tracks. Because of their versatility, DVD's may by used in a wide range of applications including home entertainment, computers, and business information systems. Film, television, and music producers are increasingly turning to DVD's as a medium for offering movies, television episodes and music albums to the public.

DVD's are an optimal medium for presenting full-length movies. DVD's can produce studio-like video quality and audio quality better than compact disks (CD). DVD's are also more durable that videotape and do not suffer wear from use. Presently, a single DVD is able to store over eight hours of high quality digital video information and is also able to store multiple audio and subtitle tracks. DVD's also may store information for automatic and seamless branching of video to permit viewing of multiple story lines on a single disk. Additionally, DVD's may also store text information for providing movie credit information and biographical information on the cast and crew. DVD's may also include menus and other graphic interfaces for enhancing user enjoyment by aiding user access to various features provided on the disk.

However, in the past, movies and audio recordings stored on optical disk storage media (including those on DVD) most commonly available to consumers are offered in a fixed, read-only format. With such a format, as soon as the information is stored on a disk, the information is often quickly outdated because it is impossible to add additional information arising after the time the original information was stored on the disk. Thus, producers are confronted with the problem of how to provide their consumers with current and up to date products with this format of optical disk storage media. This problem results in the current use of fixed, read-only format disks having a very short shelf life before becoming outdated. As a result, producers are forced to periodically recall older disks and reissue updated versions of their products on new disks in order to offer current products to their consumers.

As an illustrative example, if filmographies of the actors in a movie stored on a disk are included on the disk, it is impossible to go back and update the information on the disk to include films in which the actors have acted subsequent to the creation of the disk. If the movie disk is offered to consumers several months after the disk was made, the actors may have starred in other subsequent movies. As a result, consumers obtaining this disk would never be informed about these subsequent movies when viewing the filmographies stored on their disks. Thus, the producer offering the movie on these disks is forced to recall old disks of the movie and issue new disks of the movie with the actors' subsequent movies included in updated versions of the filmographies.

Another problem producers face with a fixed, read-only format is that it is impossible to correct errors once the product has been stored on a disk. For example, if text included with a movie stored on a read-only formatted disk has spelling errors, the disk must be destroyed and the corrections to the text must be stored on a new disk. This process can become very expensive and may significantly hurt the profitability derived from the issuing of the particular movie on the disk.

An additional problem producers using the fixed, read-only format have is that it is difficult to provide updates and corrections to consumers already possessing the producer's product with this format. As an illustrative example, with a fixed, read-only format, a producer is unable to add additional menus and other graphic interfaces to the disks of existing owners without providing these owners with newly produced disks that include the upgraded feature. In one option, the producer may announce a recall to owners of their existing products and offer a newly produced issue of the product as a replacement to these owners. However, this method is expensive, laborious, time consuming, and often ineffectual because existing owners rarely want to make the effort to return their disks to the producer. Another option for a producer is to send existing owners the newly produced disks without requiring the return of the old disks back to the producer. However, this option allows the owners to pass on their old disks (which are still usable) to other consumers and thereby detrimentally reduce new consumer demand for the producer's product.

SUMMARY OF THE INVENTION

The present invention provides a system, method, and article of manufacture for updating content stored on a portable storage medium. Upon input of a portable storage medium into a machine by a user, the content stored on the portable storage medium is read. After reading the content of the portable storage medium, a separate storage medium is accessed and content is received therefrom. The content from the separate storage medium is an update of the content of the portable storage medium. This content of the separate storage medium is then displayed.

In one embodiment, the separate storage medium may be accessed upon receipt of an indication of a user action effected by the user. In one version of this embodiment, such user action may be the selection of at least a portion of the content stored in the portable storage medium in a menu or the like.

In another embodiment of the present invention, the content of the portable storage medium may additionally be compared with the content of the separate storage medium so that content of the separate storage medium is received only if the content of the separate storage medium is an update of the content of the portable storage medium.

In yet another embodiment of the present invention, the separate storage medium may be a remote server capable of being connected to the machine via a wide area network, i.e., the Internet. In one version of this embodiment, the content of the remote server is cached in a local storage medium so that the cached content may be subsequently reused. As an option, this version of this embodiment may also require that a determination be made as to whether a connection exists between the remote server and the machine so that the cached content may be received from the local storage medium when the connection is determined to be nonexistent. If a connection exists, the remote server may be automatically accessed. In another version of this embodiment of the present invention, the content of the separate storage medium may be displayed, using hyper-text mark-up language (HTML).

The present invention also includes embodiments where the portable storage medium is an optical disk such as a laser centric disk, a digital versatile disk (DVD), a compact disk read only memory (CD-ROM), a writeable compact disk (CD-W), and/or a rewriteable compact disk (CD-RW). Optionally, in these embodiments, the information may be stored on a burst cut area (BCA) of the particular optical disk or other storage area.

Also encompassed by the present invention is an embodiment where the updated content of the separate storage medium that is received includes content that is selected based on information such as an owner of the content, a profile of a user, a retailer of the portable storage medium, a distributor of the portable storage medium, a manufacturer of the machine, a date which the portable storage medium was manufactured, version of the content of the portable storage medium, and/or identifier of the portable storage medium. In this embodiment, the updated content of the separate storage medium that is received may also optionally include a menu.

The present invention enables easy updating of information stored on fixed, read-only format media. With the present invention, the shelf life of fixed, read-only format media is greatly extended. Older fixed, read-only format media no longer has to be replaced with newer media in order to provide more current information to users or in order to correct errors in the information stored on the media. In an illustrative practical application, the present invention is especially useful for updating advertisements included on fixed, read-only format media so that new advertisements can be regularly directed to users of the media. In addition, the content can be specific to a user's profile. This facilitates tailoring of the advertisements in a manner specific to the requirements and tastes of a particular user.

The present invention also permits the tailoring of the read-only media to suit the needs and preferences of a user to help increase user enjoyment of the contents of the fixed, read-only format media. Additionally, the present invention also allows information on fixed, read-only format media to be time-released or periodically unlocked to help motivate a user to regularly use the media in order to access the newly released material.

DESCRIPTION OF THE DRAWINGS

The foregoing and other objects, aspects and advantages are better understood from the following detailed description of embodiments of the invention with reference to the drawings, in which.

DETAILED DESCRIPTION

Figure 1:
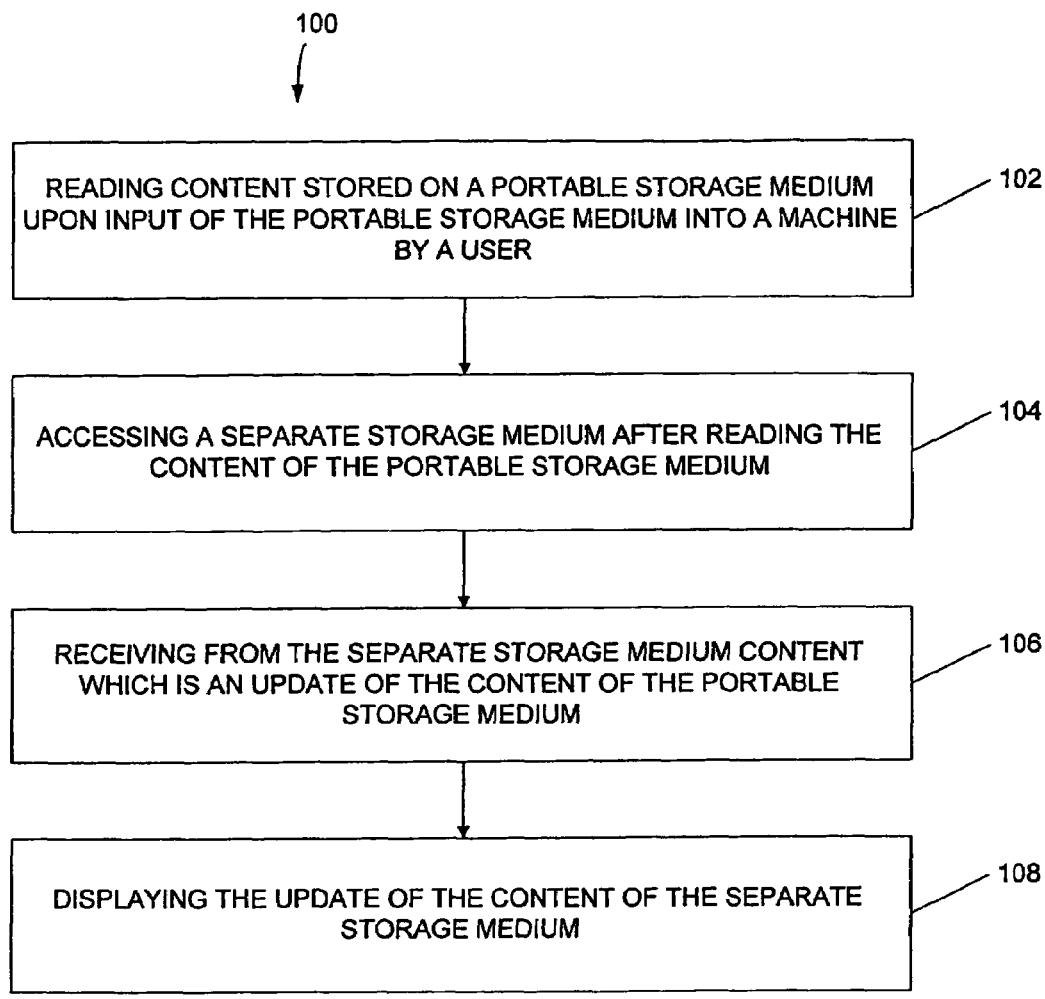
FIG. 1 is a block diagram illustrating a method of the present invention for updating content stored on a portable storage medium.

The present invention includes a system, method, and article of manufacture for updating content stored on a portable storage medium. FIG. 1 is a block diagram illustrating a method 100 for updating content stored on a portable storage medium. In operation 102, content stored on a portable storage medium is read upon the portable storage medium being input into a machine by a user. A separate storage medium is accessed in operation 104 after reading the content of the portable storage medium. Content which is an update of the content of the portable storage medium is received from the separate storage medium in operation 106. Finally, in operation 108, the update of the content of the separate storage medium is displayed. Some or all of the content stored on the portable storage medium may also be displayed.

It should be noted that the portable storage medium may take the form of any electronic/optic storage medium capable of storing content. Exemplary portable and separate storage mediums include locally or remotely accessible hard drives and floppy disks as well as any laser centric disk including, but not limited to, a digital versatile disk (DVD), a compact disk read only memory (CD-ROM), a writeable compact disk (CD-W), a rewriteable compact disk (CD-RW) or a MiniDisk (produced by Sony Corporation). In the present description, however, focus will remain on one embodiment of portable storage medium, a DVD.

In one embodiment of the present invention, the separate storage medium is accessed upon receiving an indication of a user action, which is effected by the user. The content of the portable storage medium may be displayed upon reading the content of the portable storage medium. In such case, the user action could include selection of at least a portion of the displayed content, i.e., a menu, of the portable storage medium.

In another embodiment of the present invention, the content of the portable storage medium and content of the separate storage medium are compared, such as to determine whether the content of the separate storage medium is an update of the content of the portable storage medium. In one embodiment, the content of the separate storage medium is received only if such content is an update of the content of the portable storage medium.

The update of content of the separate storage medium that is received in operation 106 of FIG. 1 may include content that is selected based on information such as an owner of the content, a profile of a user, a retailer of the portable storage medium, a distributor of the portable storage medium, a manufacturer of the machine, a date which the portable storage medium was manufactured, version of the content of the portable storage medium, and/or identifier of the portable storage medium.

Figure 2:
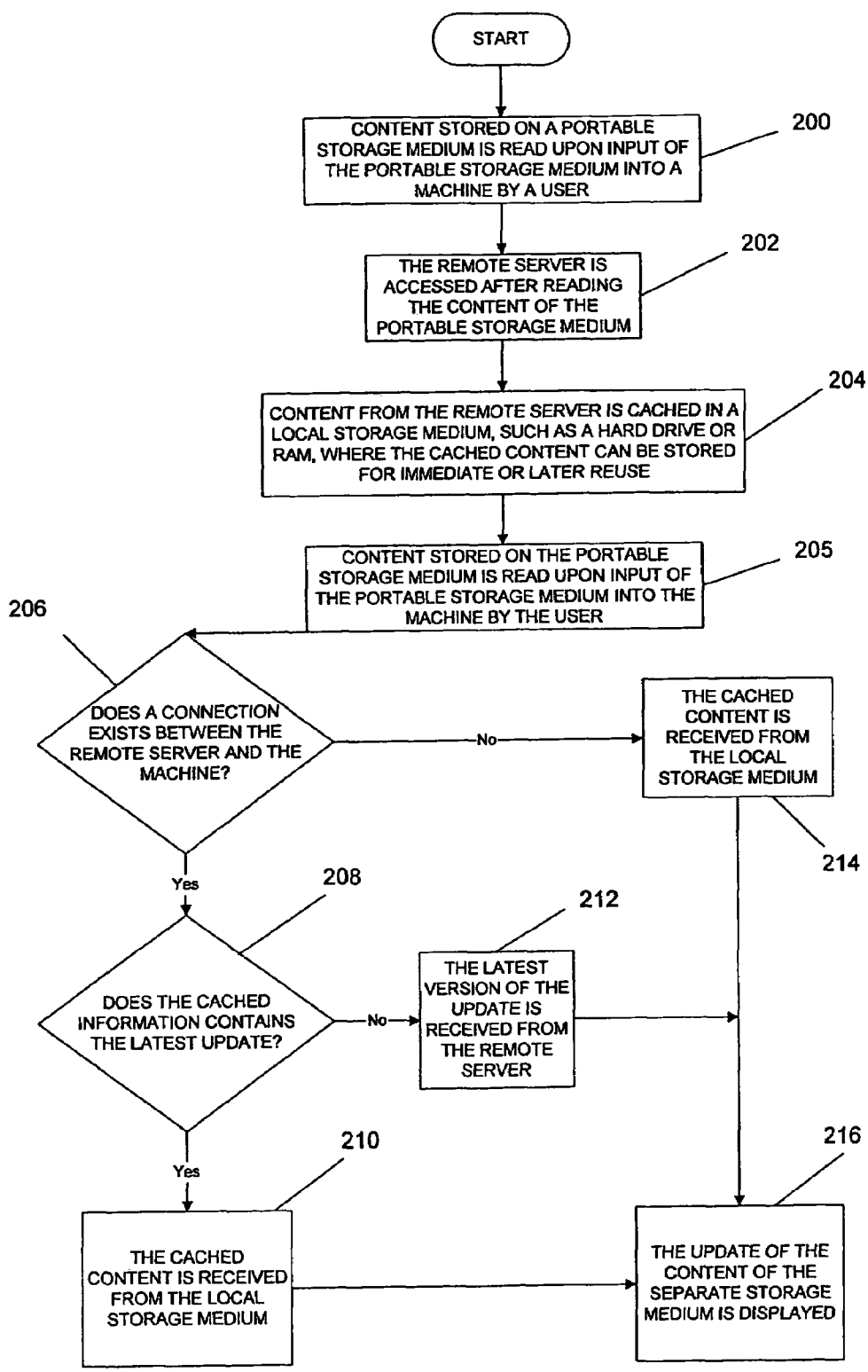
FIG. 2 is a flow diagram depicting an embodiment of the present invention designed for receiving updates over a network.

FIG. 2 is a flow diagram depicting an embodiment of the present invention designed for receiving updates over a network. In this embodiment, the separate storage medium is a remote server capable of being connected to the machine via a wide area network, such as the Internet. In operation 200, content stored on a portable storage medium is read upon input of the portable storage medium into a machine by a user. The remote server is accessed in operation 202 after reading the content of the portable storage medium. In operation 204, content from the remote server is cached in a local storage medium, such as a hard drive or RAM, where the cached content can be stored for immediate or later reuse. Operation 205 indicates an operation similar to that of operation 200, but performed at a later time.

In decision 206, it is determined whether a connection exists between the remote server and the machine. If it is determined in decision 206 that a connection exists, the cached content is compared to the content on the remote server in decision 208 to determine whether the cached information contains the latest update. If it is determined that the cached information includes the latest update, the cached content is received from the local storage medium in operation 210. If it is determined that the cached information does not include the latest update, the latest version of the update is received from the remote server in operation 212. It should be noted that decision 208 can be executed by comparing the cached content with tat stored in the remote server. This procedure will be explained more fully hereinafter in greater detail.

If it is determined in decision 206 that the connection is nonexistent, the cached content is received from the local storage medium in operation 214. Finally, in operation 216, the update of the content of the separate storage medium is displayed. It should be kept in mind that a remote server may include a remote database. Optionally, the remote server may be automatically accessed if the connection exists. Also optionally, the content of the separate storage medium can be displayed using hyper-text mark-up language (HTML).

Referring to decision 208, the determination of whether the data is updated information can be determined referring to and comparing:

Version number—simple version number compare

Date—simple date compare

Personalization—based on user profile/ID, demographic, product

Distribution channel—based on retailer, manufacturer, distributor, content owner Seamlessly ties into other systems.

For example, an updated menu can be "sponsored" by a retailer (which can be determined by utilizing the BCA)

Or a personalized audio stream can be downloaded based on the consumer's profile.

Figure 3:
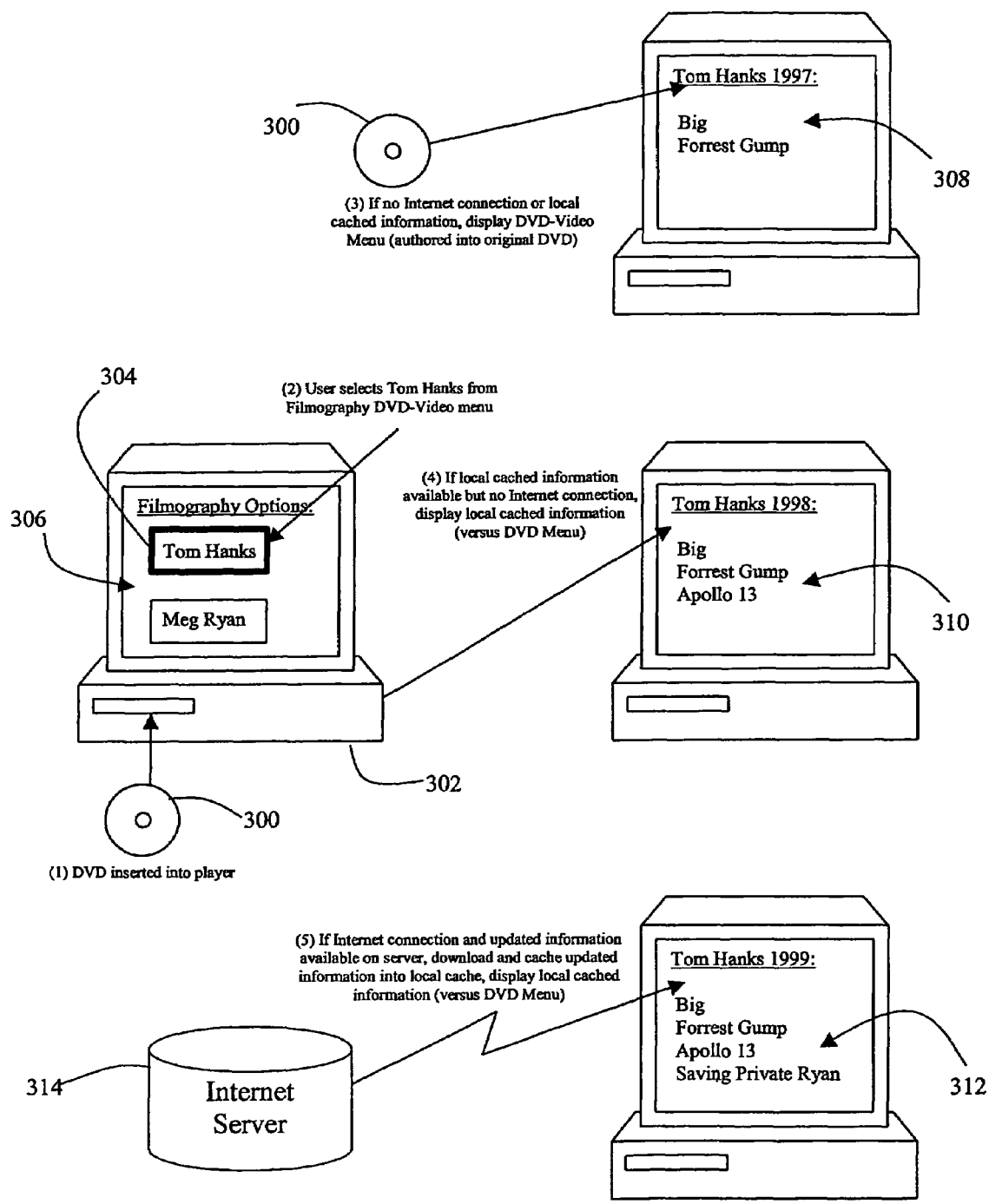
FIG. 3 is a flow diagram that graphically illustrates the embodiment depicted in FIG. 2 in use.

FIG. 3 is a flow diagram that graphically illustrates an example of the embodiment depicted in FIG. 2 in use. In operation (1) of FIG. 3, a DVD 300 is inserted into the player 302. In operation (2), the user selects Tom Hanks 304 from Filmography DVD-Video menu 306. If there is no Internet connection and no local cached information, the DVD-Video Menu 308, which is authored into the original DVD 300, is displayed in operation (3). If local cached information 310 is available but no Internet connection is available, the local cached information 310 (in place of or along with DVD Menu 308) is displayed in operation (4). If an Internet connection is present and updated information 312 is available on a remote server 314, the updated information 312 is downloaded and cached into a local cache in operation (5). Also in operation (5), the updated information 312 (in place of or along with the DVD Menu 308) is displayed.

An exemplary embodiment utilizing a DVD attempts to always present a user with the latest information. Since the DVD is fixed (write-once), it is therefore immediately outdated upon manufacturing and shipment. Certain content on the DVD can be updated with more recent content from either the local storage medium or directly over the Internet. The value of utilizing a local storage medium is that it does not necessarily require the user to be physically connected to the Internet which can tie up a communication link such as a telephone line (which in the case of international Internet usage may become very expensive if the user is charged for the time spent on their Internet connection).

In this embodiment, content or digital assets can be downloaded or "pushed" from a remote location over the Internet and then stored locally for future viewing. The present invention automatically "serves" up (displays to the consumer) the latest version of information. The software can automatically detect the state of the consumer's device:

If an Internet connection exists, the latest information can be displayed over the Internet. During "free" Internet cycles, the software of the present invention can be automatically downloading (or caching) other updated information to the consumer's local storage device.

If an Internet connection does not exists, the software can serve-up/display the latest information present on the consumer's local storage device (possibly downloaded from an earlier connection to the Internet) if any exists. The logic that determines which information to display is seamless and transparent to the consumer.

Finally, if no updated information is available, then the information on the DVD is used.

This embodiment of the present invention accomplishes this task by utilizing a distributed database/control structure having:

A first level database that is integrated onto physical media (DVD)

A second level database that is stored on local storage device. The second level database contains control structure for determining when to display information from: (1) DVD, (2) from assets stored on consumer's local storage device, or (3) from the Internet. This second level database may be downloaded from the server upon detected Internet connection.

A third level database which is the master database stored on a remote server. This database can be thought of as the most recent, up-to-date location of assets or control structure. It also contains the latest control structure to be downloaded to the consumer's local storage device.

Figure 4:
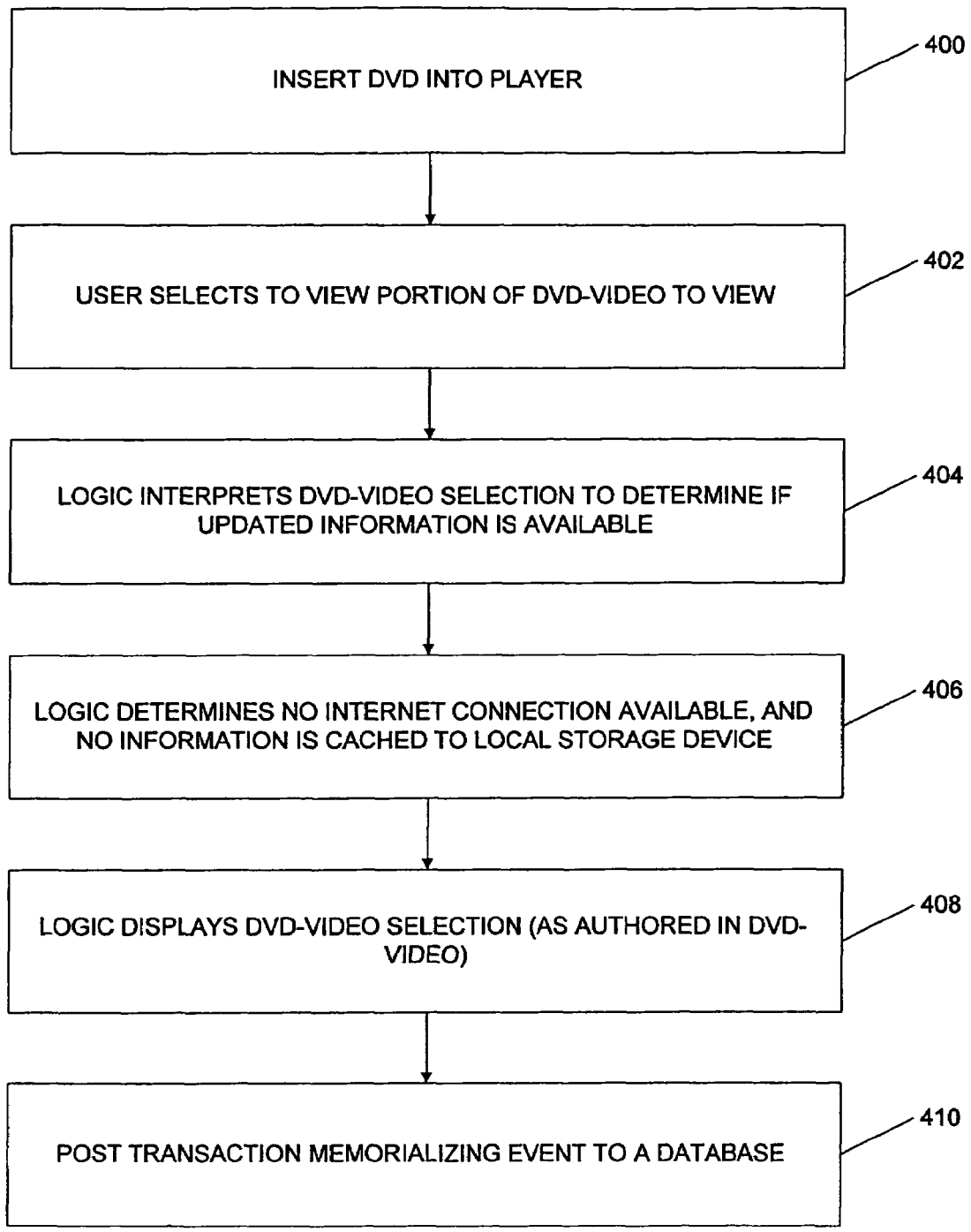
FIG. 4 is a flowchart demonstrating the display of specific information from a DVD when no updated information is available in accordance with one embodiment of the present invention.
Figure 5:
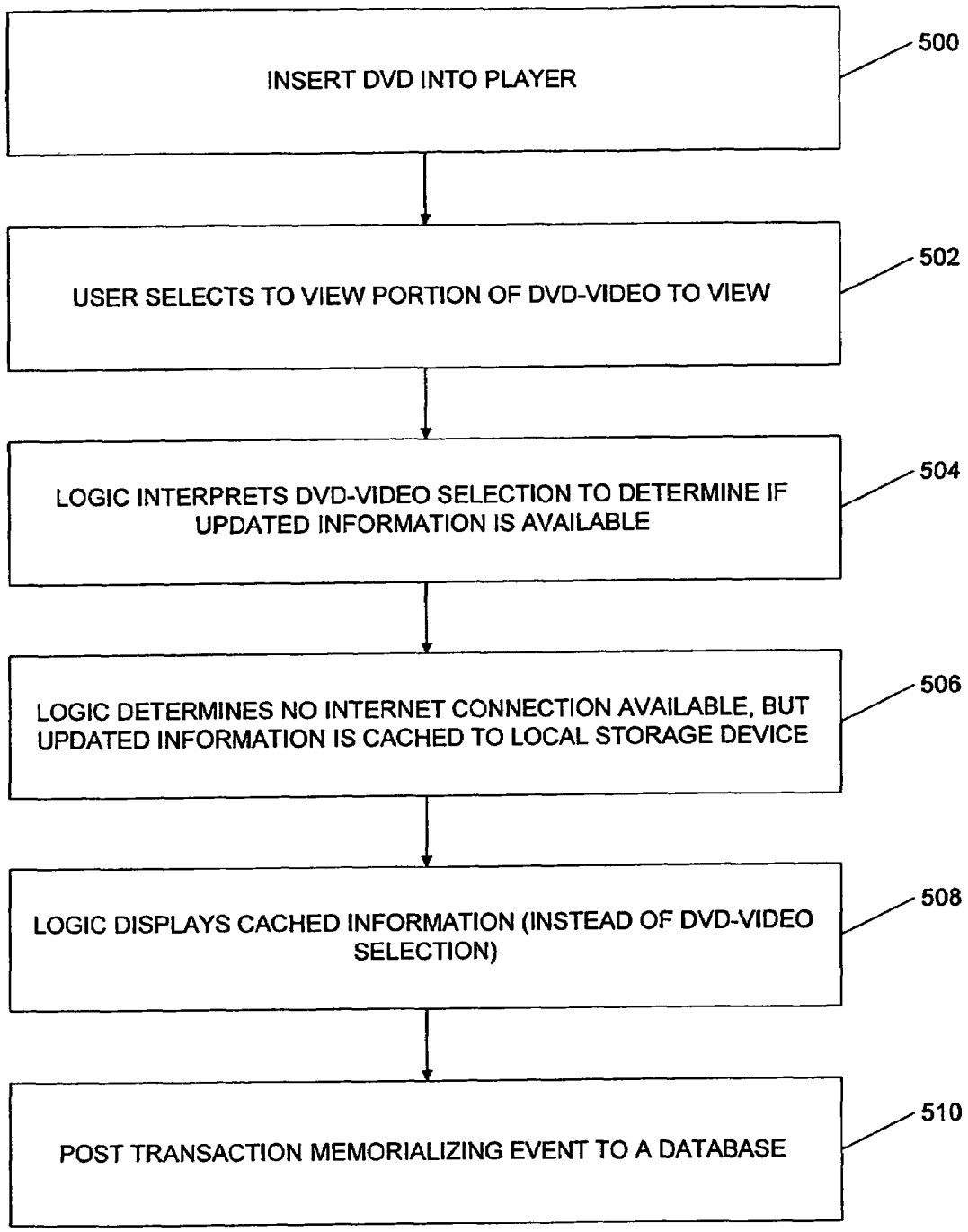
FIG. 5 is a flowchart demonstrating the display of updated information cached on a local storage device in accordance with one embodiment of the present invention.
Figure 6:
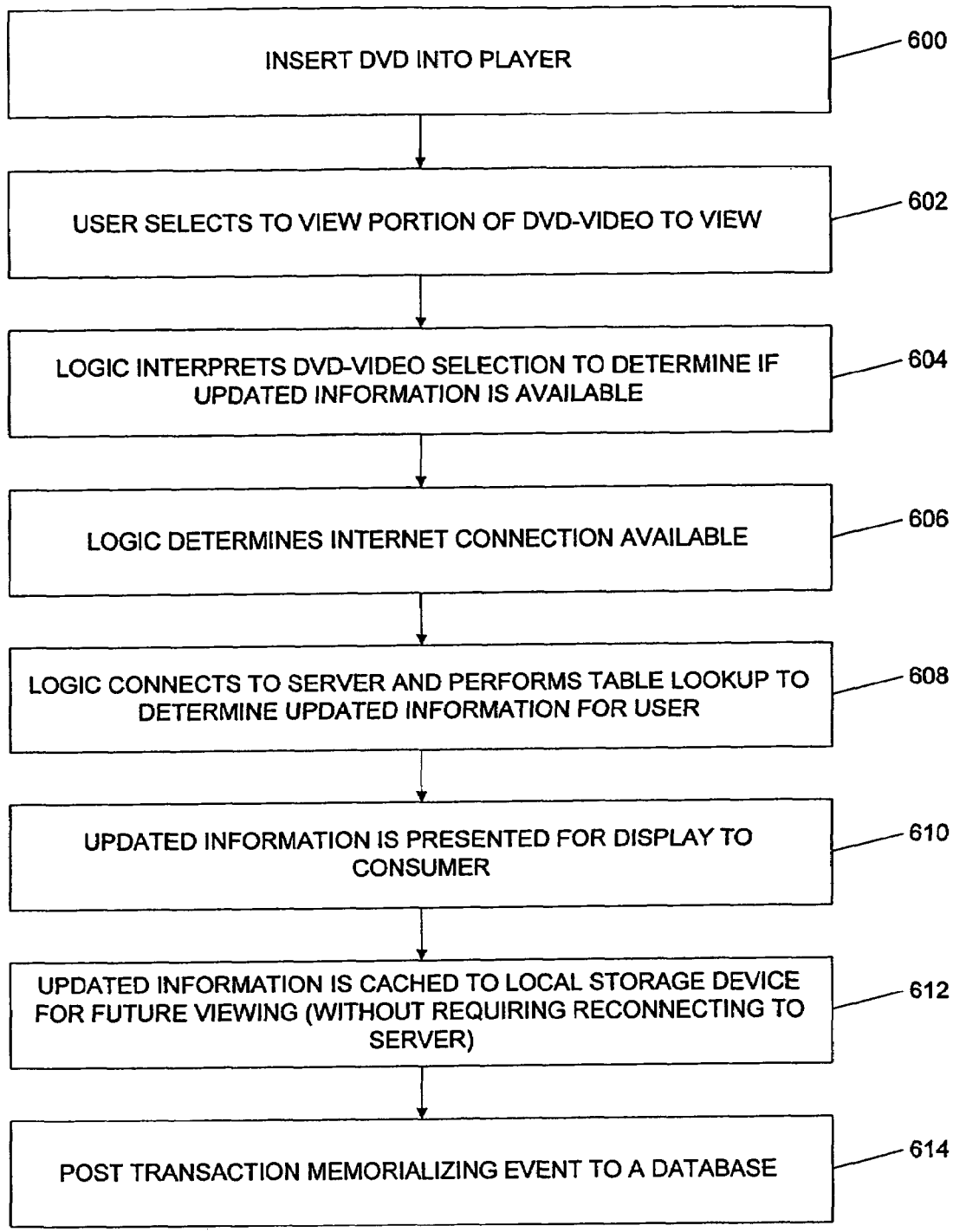
FIG. 6 is a flowchart demonstrating the display of updated information from a remote server in accordance with one embodiment of the present invention.

FIGS. 4 through 6 illustrate exemplary scenarios for updating information stored on a DVD in accordance with one of the above embodiments.

FIG. 4 is a flowchart demonstrating the display of specific information from a DVD when no updated information is available. Processing commences at 400 when a user inserts a DVD into a player, and the display operation is initiated by a user action as shown in function block 402. When the user selects a portion of the video to display at 402, logic is initiated to interpret the user's selection as shown in function block 404. The logic determines that an Internet connection is not available and further determines that no updated information has been downloaded or cached to the user's local storage as shown in function block 406. Once the logic has determined that the information contained in the DVD-Video is the correct information to display, the logic displays the DVD-Video selection as shown in function block 408. Finally, in operation 410, a transaction is posted to a local database that memorializes the events associated with the display operation 408.

FIG. 5 is a flowchart demonstrating the display of updated information cached on a local storage device. Processing commences at 500 when a user inserts a DVD into a player, and the display operation is initiated by a user action as shown in function block 502. When the user selects a portion of the video to display at 502, logic is initiated to interpret the user's selection as shown in function block 504. The logic determines that an Internet connection is not available and that updated information has been downloaded or cached to the user's local storage as shown in function block 506. Once the logic has determined that updated information cached on the local storage device is the available for display, the logic intercepts the DVD-Video selection and instead displays the cached local information as shown in function block 508. Finally, in operation 510, a transaction is posted to a local database that memorializes the events associated with the display operation 508.

FIG. 6 is a flowchart demonstrating the display of updated information from a remote server. Processing commences at 600 when a user inserts a DVD into a player, and the display operation is initiated by a user action as shown in function block 602. When the user selects a portion of the video to display at 602, logic is initiated to interpret the user's selection as shown in function block 604. The logic determines that an Internet connection is available, as shown function block 606, and a connection to a remote server is initiated. The server performs a table lookup to determine if there is updated information for display to the user based on certain criteria (using version numbers, date, user ID, retailer, etc.) as shown in function block 608. User information can include profile information that specifies a particular user's requirements and tastes. Information such as the BCA number can be used to determine appropriate content to transmit. Once the logic has determined that updated information on the server is available for display, the logic intercepts the DVD-Video selection and instead displays the updated information from the server as shown in function block 610. If desired, the updated information can also be cached to the local storage device for future viewing (without requiring a time-intensive connection to the remote server) as shown in function block 612. Finally, in operation 614, a transaction is posted to a local database that memorializes the events associated with the display operation 612.

An exemplary use of an embodiment of the present invention could include, for example, automatically updating a menu in DVD-Video space via the Internet and displaying the updated menu to the consumer. Further, the menu could be tailored based on certain criteria, such as profile, retailer, computer manufacturer, other.

Other exemplary DVD-Video selection/construct components that can be updated include, but are not limited to, the chapter/part of title; title; angle (of camera); audio stream, and subpicture stream.

Methods of Obtaining Updated Information

Referring again to FIG. 1, the actual retrieval of the updated content in operations 104 and 106 may be carried out in various ways. For example, the retrieved content may include only a small file containing indications of the differences between the content of the portable storage medium and the updated content of the separate storage medium. If updated content or, in other words, a file must be delivered, the amount of data can be substantial. Large files typically are as large as ten million characters (10 Megabytes) or larger. Distribution of such large files over a medium such as the Internet can take an undesirably long time from the point of view of the customer and can consume a large amount of server resources from the point of view of the remote server.

One solution to the problem of distributing the updated content on large computer files is use of compression. A number of standard compression algorithms are in existence and are commonly used today. These algorithms typically achieve compression of a large executable file down to between 40% to 60% of its original file size and can compress some types of text files even further, thereby reducing the transaction costs of shipping the file. However, for very large computer files or collections of files, even a compressed file reduced to 40% still represents a substantial transmission cost.

Another method useful for transmitting updated files is using a technique known as a differencing program or comparator program to compare an old file to a new revised file in order to determine how the files differ. One such file system is distributed as part of the GNU UNIX-like operating system through tools referred to as diff and patch and described in standard GNU documentation. The described system discusses a way to use a differencing program to generate a patch file, and then using that patch file in combination with the old file to generate a newly revised file. While the GNU revision system has some applications within the UNIX-like operating system within which it was developed, it has not been generalizable in the new environment of personal computer systems. The most commonly available versions of the system are limited to text files, and achieve only limited compression. These programs cannot effectively handle files where a number of fairly complex changes have occurred, such as a number of block moves or random shuffling of text strings. These programs also do not produce the smallest patch file possible.

In the alternative, a method and system may be employed for generating a difference file from an old file and a new file, where that difference file indicates, in minimal number of bytes, changes between the old file and the new file. Such system allows users to then transmit the difference file to a computer system, and to use that difference file and the old file along with a decoding process to generate a newly revised file. The difference file can also be stored locally, allowing a number of versions of the same file to be saved without duplicating redundant information. Ideally, the difference file would be the smallest possible difference file, achieving compression density of perhaps 10% or less of the original file, even with a moderate number of changes between the two files.

The present invention may thus comprise a software system with several components, a method, and a file structure for generating very efficient difference files (sometimes abbreviated DIFF file) from an old file and a new file so that a difference file can be transmitted to a computer system where the difference file and a duplicate of the old file can quickly be used to create a copy of the new file, duplicating the new file as it existed on the separate storage medium. The difference file could also be stored locally to the computer system, allowing the new file to be duplicated from the old file without storing the new file.

Use of Burst Cut Area (BCA) to Tailor Updated Information

Initially, at the time of manufacture, content in the form of music, video, data, or any other type of visual or audible entertainment or information is generated and stored on the portable storage medium. Thereafter, a storage medium identifier, such as the Burst Cut Area (BCA) is incorporated onto the portable storage medium at the time of manufacture. It should be noted that the portable storage medium may take the form of any electronic/optic storage medium capable of storing content. In the present description, however, focus will remain on one embodiment of portable storage medium, a DVD.

Utilization of BCA Identification at the End Consumer

As mentioned earlier, when a final user obtains the portable storage medium, the portable storage medium may be identified using the tracking identifier on the portable storage medium. By this identification, various features may be executed upon identification of the portable storage medium. It should be noted that, in one embodiment, identification is carried out by a computer and software governs the features that are executed after identification of the portable storage medium.

Figure 7:
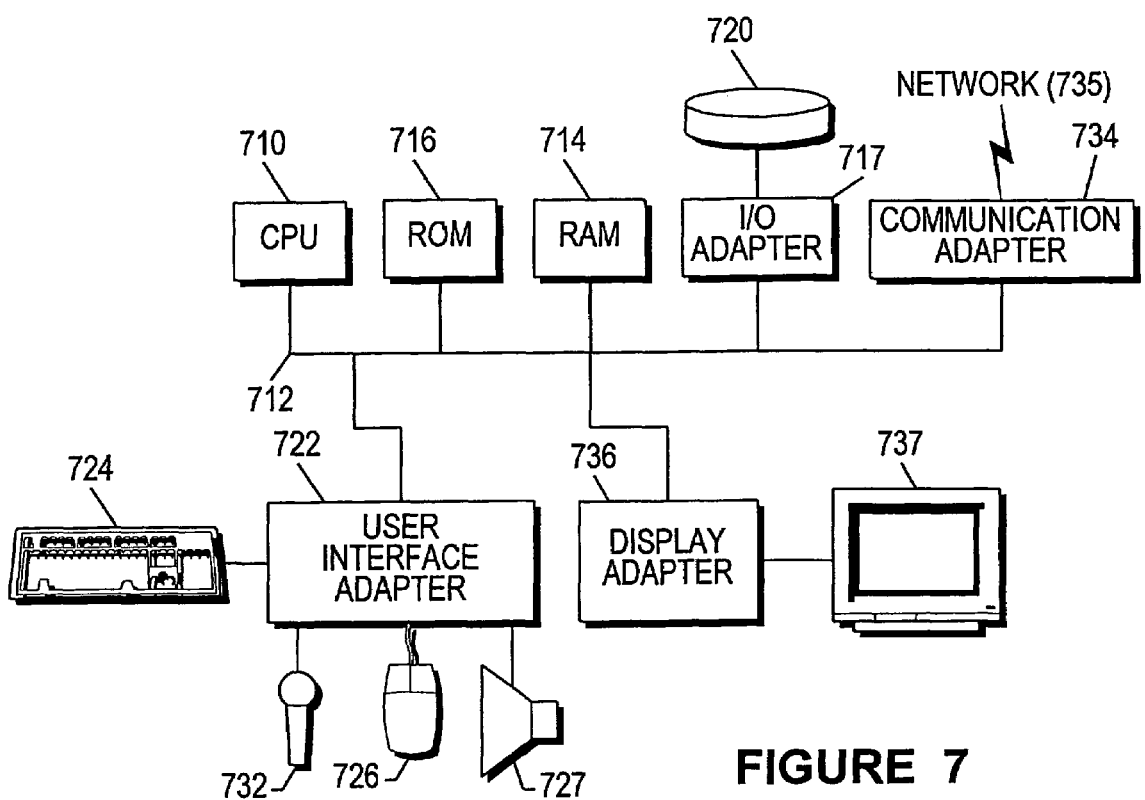
FIG. 7 is a detailed block diagram of an exemplary hardware configuration in accordance with a one embodiment of the present invention.

For example, the present invention may be practiced in the context of a personal computer such as an IBM compatible personal computer, Apple Macintosh computer or UNIX based workstation. A representative hardware environment is depicted in FIG. 7, which illustrates a typical hardware configuration of a workstation in accordance with a preferred embodiment having a central processing unit 710, such as a microprocessor, and a number of other units interconnected via a system bus 712. The workstation shown in FIG. 7 includes a Random Access Memory (RAM) 714, Read Only Memory (ROM) 716, an I/O adapter 718 for connecting peripheral devices such as disk storage units 720 to the bus 712, a user interface adapter 722 for connecting a keyboard 724, a mouse 726, a speaker 728, a microphone 732, and/or other user interface devices such as a touch screen (not shown) to the bus 712, communication adapter 734 for connecting the workstation to a communication network (e.g., a data processing network) and a display adapter 736 for connecting the bus 712 to a display device 738. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned, so for example, a Compact Disk (CD) or DVD can be utilized for storing content. In addition, a local cache can be used to store information from the Internet or other source for use in updating the CD or DVD content. So, for example if someone was viewing Tom Hanks in Forrest Gump, the local cache would be updated with information about Apollo 13 and Saving Private Ryan to prompt the user with other Tom Hank selections. Moreover, if there is a new executable for executing the content, it too would be downloaded to the local cache for execution.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the WorldWide Web global information initiative since 1990. HTML is an application of ISO Standard 8879; 1986 Information Processing Text and Office Systems—Standard Generalized Markup Language (SGML).

To date, Web development tools have been limited in their ability to create dynamic Web applications that span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Alternate Embodiments

It should be noted that various permutations of serialization may be employed including, but not limited to a watermark, hologram, and any other type in substitution or combination with the BCA information without diverging from the spirit of the claimed invention.

Watermarking

Digital video data can be copied repeatedly without loss of quality. Therefore, copyright protection of video data is a more important issue in digital video delivery networks than it was with analog TV broadcast. One method of copyright protection is the addition of a "watermark" to the video signal which carries information about sender and receiver of the delivered video. Therefore, watermarking enables identification and tracing of different copies of video data. Applications are video distribution over the World-Wide Web (WWW), pay-per-view video broadcast, or labeling of video discs and video tapes. In the mentioned applications, the video data is usually stored in compressed format. Thus, the watermark must be embedded in the compressed domain. An approach for robust watermarking of MPEG-2 encoded video is presented in accordance with an alternate embodiment. The method is of much lower complexity than a complete decoding process followed by watermarking in the pixel domain and re-encoding. Although an existing MPEG-2 bitstream is partly altered, the method avoids drift by adding a drift compensation signal. The method has been implemented and the results confirm that a robust watermark can be embedded into MPEG-encoded video which can be used to securely transmit arbitrary binary information at a data rate of several bytes/second.

The method is easily applicable to other video coding schemes like MPEG-1, H.261, and H.263. Digital watermarks exist at a convergence point where creators and publishers of digitized multimedia content demand localized, secured identification and authentication of that content. Because existence of piracy is clearly a disincentive to the digital distribution of copyrighted works, establishment of responsibility for copies and derivative copies of such works is invaluable. In considering the various forms of multimedia content, whether "master," stereo, NTSC video, audio tape or compact disc, tolerance of quality degradation will vary with individuals and affect the underlying commercial and aesthetic value of the content.

It is desirable to tie copyrights, ownership rights, purchaser information or some combination of these and related data to the content in such a manner that the content must undergo damage, and therefore a reduction in value, with subsequent, unauthorized distribution of the content, whether it be commercial or otherwise. Legal recognition and attitude shifts, which recognize the importance of digital watermarks as a necessary component of commercially distributed content (audio, video, game, etc.), will further the development of acceptable parameters for the exchange of such content by the various parties engaged in the commercial distribution of digital content.

These parties may include artists, engineers, studios, Internet access providers, publishers, agents, on-line service providers, aggregators of content for various forms of delivery, on-line retailers, individuals and parties that participate in the transfer of funds to arbitrate the actual delivery of content to intended parties. Since the characteristics of digital recordings vary widely, it is a worth while goal to provide tools to describe an optimized envelope of parameters for inserting, protecting and detecting digital watermarks in a given digitized sample (audio, video, virtual reality, etc.) stream. The optimization techniques described hereinafter make unauthorized removal of digital watermarks containing these parameters a significantly costly operation in terms of the absolute given projected economic gain from undetected commercial distribution. The optimization techniques, at the least, require significant damage to the content signal, as to make the unauthorized copy commercially worthless, if the digital watermark is removed, absent the use of extremely expensive tools. Presumably, the commercial value of some works will dictate some level of piracy not detectable in practice and deemed "reasonable" by rights holders given the overall economic return. For example, there will always be fake $100 bills, LEVI jeans, and GUCCI bags given the sizes of the overall markets and potential economic returns for pirates in these markets—as there also will be unauthorized copies of works of music, operating systems (Windows 98, etc.), video and future multimedia goods. However, what differentiates the "digital marketplace" from the physical marketplace is the absence of any scheme that establishes responsibility and trust in the authenticity of goods. For physical products, corporations and governments that mark the goods and monitor manufacturing capacity and sales to estimate loss from piracy. There are also no reinforcing mechanisms, including legal, electronic, and informational campaigns to better educate consumers.

With the advent of digital video and digital video broadcasting, issues of copyright protection have become more important, since the duplication of digital video does not result in the inherent decrease in quality suffered by analog video. One method of copyright protection is the addition of a "watermark" to the video signal. The watermark is a digital code embedded in the bitstream of the digital video that typically identifies the copyright owner. The watermark, if applied to individual copies of the video, may also be used to identity of the receiver of each copy. This processing identifies illegally reproduced copies and facilitates tracing back to the receiver from which they originated. For watermarking of digital video, a number of different characteristics of the watermark are desirable. First, the watermark should be embedded in such a way that it is imperceptible or barely perceptible to a viewer of the video. Secondly, the watermark should be such that it cannot be removed by intentional or unintentional operations on the digital video bitstream or on the decoded video without, at the same time, degrading the perceived quality of the video to the point of significantly reducing its commercial value (a characteristic referred to as "robustness"). Thirdly, since the video may be stored for broadcast in a compressed form (such as in a "video-on-demand" server), it is desirable to be able to incorporate the watermark into the bitstream without having to decode the signal first and to re-encode it after adding the watermark. This can be accomplished with the watermarking of digital still images, but the method used does not lend itself to digital video, due to the additional constraints which video signals present. Many digital video applications are "constant bit rate" applications, which do not tolerate increases in the bit rate of the transmitted bitstream. Even in those applications which are not restricted to a constant bit rate, unnecessary increases in the bit rate should be avoided, so as to preserve the real-time decodability of the video signal when transmitted over a channel having a given bandwidth. Thus, it is desirable that the addition of the watermark does not increase the bit rate of the video signal. Past watermarking techniques for digital video are limited to the watermarking of uncompressed video data. However, since video sequences are often stored in a compressed format (thereby saving on memory space), watermarking the signal in a way which uniquely identifies each receiver of the signal would require decoding of the signal, addition of the watermark, and recoding before the signal is transmitted. This clearly places a significant time and processing burden on the task of delivering the video sequence.

Hologram

Information exchange and transfer over a shared transmission channel present a challenge to the security of sensitive information. Internet and Intranet are two examples of such a shared information transmission channeling which many computers are connected with one another by local or wide area communication networks. It is therefore possible for any user or an intruder to intercept a package of sensitive data that is transmitted over the shared channel. In particular, the internet is a rapidly growing business forum and securing information transferred through its channels is becoming a major concern for transmitting proprietary information. Data encryption techniques can be used to increase the security in data exchange and transfer over a shared transmission channel. In its simplest form, data encryption uses a "key" based on a particular algorithm to change the sequence of a package of data that contains a piece of confidential information ("plain text") so that the data is enciphered or "scrambled" into an form that appears to have no correlation with the embedded confidential information ("cipher text"). An unauthorized user, who does not have the knowledge of either the encryption method (e.g., the encryption algorithm) or the key formed based on the encryption method, cannot easily decode the information. An authorized user recovers the embedded information in the scrambled data by using a "key" that is constructed based on the encryption method. Therefore, even if the unauthorized user obtains the scrambled data, the knowledge of both of the encryption method and the particular key is needed to decrypt the confidential information embedded therein.

One well-known encryption system is the Data Encryption Standard (DES) adapted in 1977 by the National Bureau of Standards. This is a secret-key crypto system to exploit confusion and diffusion techniques, allowing acceptable security using key lengths as short as 64. The number of keys in crypto systems based on the DES can be as many as 512 keys with the current computational power. However, increased key lengths "cost" significant delays in transmitting and receiving the encoded information. Two main kinds of crypto systems are a symmetrical system, i.e., the private key system, and an asymmetrical system, i.e., the public-private key system. The DES symmetric crypto systems typically encrypt 64 bit blocks of plain text using a key length of 56 bits. The fundamental building blocking DES (referred to as a round) is a single combination of a substitution followed by a permutation of the text, based on the key.

The plain text is encoded through 16 rounds of a function, which usually implement substitution, permutation, XOR and shift operations on subsets of the text and the key in such a way that every bit of the cipher text depends on every bit of the plain text and every bit of the key. This means that if a single bit of the cipher text is corrupted during transmission, the entire message may be lost. This is another weakness of DES-type block ciphers. In each round, a different subset of the elements from the key, Ki, are used to perform the encryption (hence K1 is applied during the first round, and Ki is applied during the ithround, etc.). An analogous algorithm is used to decrypt the cipher text, but the keys are now applied in reverse order, and the shift operations change from left to right. Given the complexity of the DES algorithm, the speed at which DES is encrypted is a function of the processor characteristics for both hardware and software implementations. For example, Digital Equipment Corporation makes a hardware DES chip which can encrypt and decrypt at a rate of 1 GBit/sec, or 15.6 million DES blocks per second. Software implementations are slower; for example, an IBM 3090 mainframe can encrypt 32,000 DES blocks per second.

Typical software implementation performances for microcomputers are listed in the Table 1 herein. TABLE 1 Encryption Rates using some microprocessors Bus width DES Blocks Processor Speed (MHz) (bits) (per/sec) 8088 4.7 8 37068000 7.6 16 90080286 6.0 16 1,10068020 16.0 32 3,50068030 16.0 32 3,90080280 25.0 16 5,00068030 50.0 32 9,60068040 25.0 32 16,00068040 40.0 32 23,20080486 33.0 32 40,600. Another prior art cryptography system is the RSA Public Key Crypto system available from the RSA Data Security in California. RSA is an asymmetric crypto system in which two different keys are used: a public key to encrypt the plain text and a private key to decrypt the cipher text. The hardware implementations of RSA are usually about 1000 to 10,000 times slower than a hardware implementation of DES. In software implementations, RSA is generally about 100 times slower than DES. These numbers will improve as technology advances, but the processing speed of RSA will be difficult to approach the speed of a symmetric crypto system. Consequently, RSA is generally not viewed as a replacement for DES or any other fast bulk encryption algorithm. Instead, RSA is often used for secure key exchange without prior exchange of secrets. Hence a long message is encrypted with DES.

The message is sent with its DES key encrypted via RSA public key encryption. Many other prior-art encryption systems are variations of the DES-type encryption. Generally, it is suspected that given the advanced state of computational processors, DES may no longer be safe against a brute-force attack, so alternatives have actively been sought since the late 1980's. In response to this need, several alternatives have been developed and are thought to be competitive with DES in terms of the level of security provided. Examples of these systems include the following encryption methods.

(1) Triple DES. This is a variation of DES where the plain text is encrypted with the DES algorithm by three different keys in succession. This is commonly accepted to be equivalent to increasing the size of the DES key to 112 bits. Triple encryption of the plain text is the current method of dealing with misgivings about DES's security, but this is clearly done at the expense of the throughput rate for encrypting and decrypting messages.

(2) REDOC, a block algorithm which has a 20 byte (160-bit key) and that operates on an 80 bit block. All of the manipulations, (i.e. substitutions, permutations, and key XOR's) are performed on bytes, which makes it more efficient in software than DES whose initial and final permutations are difficult to efficiently implement in software. In addition, the 160 bit key usually makes this algorithm very secure.

(3) Khufu is a recently proposed 64 bit block cipher, which calls for a 512-bit key, and leaves the number of rounds open (either 16, 24, or 32). Because of the large key, and the potentially expanded number of rounds, the security of this algorithm is expected to be very high. However, increasing the number of rounds has the disadvantage of slowing the rate at which data can be encrypted.

(4) IDEA is a 64-bit block cipher that utilizes a 128 bit key. It usually utilizes three basic operations, XOR, addition modulo $2^{16}$, and multiplication modulo $2^{16}$. The algorithm typically operates on 16-bitsub-blocks, which makes it efficient, even on 16 bit processors. Its current software implementations are about as fast as DES. In view of the limitations and disadvantages of the various prior-art encryption systems, the inventors of the present invention developed a new crypto system based on optical phase modulation and a corresponding implementation interface between a user computer and the network. An embodiment in accordance with the present invention can exchange any of these methods for enciphering information embedded in a digital bit stream prior to digitization and transmission over a shared network such as the internet.

A holographic de-scrambler can be used at the receiving end in accordance with a preferred embodiment by an authorized user to decipher the information. One of many advantages of the present invention is the potential to achieve high rate of encryption/decryption (e.g., larger than 1 Gbit/s) as optical fiber networks of high data rates (e.g., larger than 2.4 Gbit/s) become more common. In one of several preferred embodiments of the present invention, a package of digital data is first imprinted on a carrier light beam. This is done by using a two-dimensional spatial light modulator. The phase of the data-bearing optical waveform is subsequently distorted by a phase-scrambling medium. Next, the data-bearing optical waveform with distorted phase is used to form an optical hologram with a reference beam. The hologram is then converted into electronic signals which are sent to its destination in digital form over a shared transmission channel. At the destination where the scrambled data is received, the hologram is displayed in a spatial light modulator and a conjugate reconstruction thereof is performed to generate a conjugate of the data-bearing signal waveform with distorted phase. A holographic medium having information indicative of the phase-scrambling medium is used to unscramble the phase and the embedded data is retrieved from the conjugate reconstruction optical waveform by using a light detector array such as a CCD array. One aspect of the present invention is to achieve optical encryption keys up to and greater than $10^6$ keys to enhance the security.

This is a difficult implementation for many prior art systems. Such a large number of encryption keys is possible because of the unique optical analog technique in accordance with the present invention. It is another aspect of the present invention to insure fast enciphering and deciphering of a large encryption key that are rarely obtainable with the prior-art systems. The preferred embodiments implement this by using the high-speed optical reconstruction of a data-bearing hologram and the capability of parallel processing of optical data processing devices. It is yet another aspect of the present invention to increase the confidentiality of the encryption schemes by using unconventional analog-based enciphering and deciphering of digital data. This aspect is particularly advantageous in view of the current lack of a theoretical foundation for decrypting analog-based encryption. A brute force attacked encryption based on algorithm techniques is nearly impossible for invading the cryptography systems in accordance with the present invention. It is yet another aspect of the present invention to use optical phase information in a nonobvious way to encipher and decipher digital data. It is yet another aspect of the present invention that optical holographic techniques are used in both enciphering and deciphering processes to further enhance the confidentiality of the encryption systems in accordance with the present invention. It is yet another aspect of the present invention that the phase conjugate reconstruction of data-bearing holograms are implemented in preferred embodiments to ensure the high fidelity of the analog deciphering process. It is yet another aspect of the present invention to integrate optical processing technology, hardware encryption, opto-electronic interfacing, and high-fidelity and fast-speed digital signal transmission to form a highly secure, fast and versatile encryption system that works independent of the transmission media utilized. It is still another aspect of the present invention to complete the encryption or decryption process in a single step, instead of the 16 rounds of complex computations typically found in most symmetric encryption schemes. In the optical encryption systems in accordance with the present invention, the encrypting speed is usually not limited by the size of the encryption key, but rather by the system speed in converting between the electronic-to-optical and the optical-to-electronic information modes.

Other Serialization

In the past, merchants have unsuccessfully employed various methods in an attempt to track and identify their inventory. Engraving, stamping, painting, and marking are several methods that merchants have employed. Due to practical problems, those methods are not effectively applicable to the CD multimedia rental industry.

As is known in the art and industry of compact disc multimedia, graphical information identifying the program title and author of a recording is ordinarily placed on the top surface of a CD. Digital data is stored on or just below that top surface. In particular, digital data is stored immediately below such graphical information between the top surface and the bottom surface of the CD. The bottom surface of the CD is comprised of a section of clear material through which, in accessing the data, a laser beam from a compact disc player radiates upward.

The digital data is delicate and can easily be damaged during processes typically used to identify merchandise, which include engraving, stamping, or marking. As stated above, the digital data is closer to the top surface of the CD than it is to the bottom surface. Although the top surface of a CD usually contains graphical information applied by silk screening that partially protects the digital data from damage, the silk screened layer is thinner and more fragile than the bottom surface of a CD which comprises clear material. Thus, there is a greater need to protect the top surface of the CD and the digital data close to it from physical damage such as scratching.

Engraving may be used to identify merchandise. Engraving CDs with identification markings is problematic since engraving is often attempted on the top surface of the CD and such engraving could interfere with the digital data next to it. Moreover, even if engraving is attempted on the bottom surface of a CD where it is less likely that digital data will be damaged, the data may still be damaged during engraving due to the pressure required to be placed on the top of the CD to hold it in place and the heat that may result from such engraving. In addition, engraving may be undesirable since it is a relatively labor intensive and costly process, especially in high volume situations.

Thus, merchants have considered other less invasive methods of identification such as, for example, painting. Painting also fails to provide an effective means of identification or security due to the labor required, the cost required, and the inherent unreliability of the process given the ease with which a person can duplicate such painting. Moreover, painting may pose other problems since harm to the digital data must be avoided.

Still another option of identifying and securing inventory is the use of ordinary adhesive stickers. Such stickers do not provide an effective means of identification due to the ease with which such stickers can be removed and reaffixed to similar looking items without a means of clearly indicating any tampering with the sticker. In addition, such stickers may be difficult to manually apply to CDs (since any sticker should be precisely centered on the CD) in the absence of an applicator workstation such as the one disclosed herein. In addition, such stickers may be easy to duplicate.

Magnetic-type EAS systems are widely used to inhibit the theft of merchandise such as clothing, books, cassettes and compact disks. Electronic article surveillance (EAS) systems are often used to prevent unauthorized removal of articles from a protected area, such as a library or retail store. An EAS system usually includes an interrogation zone or corridor located near the exit of the protected area and markers or tags attached to the articles to be protected. EAS systems have been based on magnetic, RF, microwave and magneto-restrictive technologies. Regardless of the particular technology involved, the EAS systems are designed such that the tag will produce some characteristic response when exposed to an interrogating signal in the corridor. Detection of this characteristic response indicates the presence of a sensitized tag in the corridor. The EAS system then initiates some appropriate security action, such as sounding an audible alarm, locking an exit gate, etc. To allow authorized removal of articles from the protected area, tags that are either permanently or reversibly deactivatable (i.e., dual status tags) are often used.

Although EAS markers have been in common use for the theft protection of optically recorded media such as compact disks and CD-ROM's, the markers have generally been adapted for attachment to the packages containing new compact disks and have been poorly suited for direct attachment to the compact disk itself for libraries and other institutions that repeatedly check compact disks in and out to accommodate the needs of customers and clients, effective inventory control would prefer that EAS markers are attached to the compact disk.

Some markers for direct attachment to compact disks have been developed. One, available as "DCD-1" from Minnesota Mining and Manufacturing Company, St. Paul, Minn., is a single marker strip and security overlay which are attached to a compact disk. However, this marker adversely effects the mechanical balance of the disk, which can adversely affect the operation of modern high rotation speed CD-ROM drives, CD players, and other optically recorded media playback equipment which require that the media be mechanically balanced for proper operation. Another product, "CD-Guard", available from Knogo North America, Inc., Hauppauge, Long Island, N.Y., suffers the same mechanical balance drawback. An optical information storage disk comprising an embedded, generally annular, dual-status EAS marker is described in coassigned U.S. Pat. No. 5,347,508.

Other Media

It should be noted that the principles of the present invention may be applied to other types of media beyond the portable storage medium discussed hereinabove. As a disk-like recording medium (referred to hereinafter as an optical disk) on and from which an information signal is recorded and reproduced by laser beam, there are now commercially available a so-called compact disc with audio data recorded therein, a CD-ROM in which computer data is recorded, a write once optical disk on which an information signal can be recorded once and a recordable optical disk in which an information signal can be reproduced, recorded and erased.

The read-only optical disk such as a compact disc or CD-ROM has tracks on which irregular patterns, i.e., phase pits are concentrically or spirally formed on the basis of a recorded information signal formed on one surface thereof. Specifically, the read-only optical disk is composed of a disk base plate made of a transparent synthetic resin such as polycarbonate or PMMA (polymethyl methacrylate), a reflection film made of a metal such as Al or Au formed so as to cover phase pits formed on one surface of the disk base plate and a protection layer formed so as to cover the reflection film in order to protect the reflection film.

When an information signal is reproduced from the read-only optical disk, laser beam from a laser light source is converged by an objective lens and irradiated on the read-only optical disk from the disk base plate side. Reflected light flux modulated by the phase pits on the optical disk is detected by a photodetector, for example, and converted into a detected signal having a signal level corresponding to an intensity of reflected light flux, thereby allowing a reproduced signal of the information signal recorded on the read-only optical disk to be obtained.

While the read-only optical disk can provide mass-produced products (optical disks) inexpensively on the market, it is not suitable for products of small demand. For this end, write once optical disks are prepared for optical disk products of small demand and a variety of data can be provided to the user easily. As write once optical disks, there are available a write once optical disk of recording system using physical chemical change of pigment, a write once optical disk of a single layer hole forming recording system, a write once optical disk of multi-layer hole forming recording system, a write once optical disk of phase-change recording system and a write once optical disk of bubble-foaming system. Upon reproduction, in a manner similar to the read-only optical disk, a laser beam (having a weak reproduction laser power) from a laser light source is irradiated on the disk from the disk base plate side under the condition that the laser beam is converged by an objective lens. Then, reflected light flux that is modulated by previously-recorded pits is detected by a photodetector and the detected signal is converted into a detected signal having a signal level corresponding to an intensity of a reflected light bundle, thereby obtaining a reproduced signal of an information signal recorded on the write once optical disk.

When an information signal is recorded on the above write once optical disk, a laser beam (having a strong recording laser power) from a laser light source is irradiated on the optical disk from the disk base plate side under the condition that the laser beam is converged by an objective lens. Then, the power of the laser beam is turned on and off by modulating the laser beam in response to an information signal and pits (pits substantially similar to those recorded on the read-only optical disk) corresponding to the information signal are formed along recording tracks of the optical disk. Specifically, in the case of the single layer hole forming recording system, a hole is formed on the recording track at an area irradiated with a strong laser beam and this hole is recorded as a pit. In the case of a multi-layer hole forming recording system, a hole is formed on the recording track at an area irradiated with a strong laser beam, e.g., the film of the first layer and the hole on the first layer are recorded as a pit.

In the case of the phase change recording system, a portion of the recording track irradiated with a strong laser beam is changed from the amorphous state to the crystal state and the portion that was changed to the crystal state is recorded as a pit. In the case of the bubble foaming recording system, of the recording tracks, a recording layer of the portion irradiated with a strong laser beam is upheaved and the upheaved portion is recorded as a pit.

In the write once optical disk, in particular, a guide groove is formed (pre-groove portion) to allow tracking control of laser beam. An end face opposing the pre-groove is formed as a sine wave shape (generally referred to as a wobble shape) having a predetermined amplitude and a predetermined period along the track. When this wobble shape is optically detected by laser beam, it is possible to obtain a wobble signal serving as absolute time information. The wobble signal is used to control the system of the recording and reproducing apparatus and, in particular, the timing information for recording pits on the optical disk. Further, the wobble signal is used to servo-control an optical disk rotating and driving means, e.g., a spindle motor. According to the servo control operation, the rotational speed of the spindle motor is controlled such that the period of the wobble signal becomes constant.

The above write once optical disk is generally of a groove recording 10 system where pits are recorded on the pre-groove portion. When information data that is to be recorded on the write once optical disk is recorded, a target position is synchronously searched based on the period of the wobble signal obtained by optically detecting the wobble shape formed on the pre-groove portion. When the target position is detected, the above information data that is to be recorded on the write once optical disk is recorded on the target position according to a predetermined format.

On the other hand, upon reproduction, a target position is searched as described above. When the target position is detected, based on a frame synchronizing signal inserted into the data to be recorded on the write once optical disk, 2 kilobytes of data, for example, are sequentially read out, thereby reproducing recorded data.

Since the read-only optical disk and the write once optical disk are the same in reproduction principle as described above, even when the write once optical disk is loaded onto a reproducing apparatus which reproduces an information signal from the read-only optical disk, data recorded on the write once optical disk can be reproduced without distinction of the read-only optical disk.

In addition, the write once optical disk has a feature that allows a number of optical disks to be easily produced by relatively simple equipment. For this reason, there is the risk that the write once optical disk will be illegally copied (illegal copy). Specifically, initially, there is a computer system wherein a reproducing apparatus for reproducing an information signal from a read-only optical disk is connected to one external input and output terminal of a personal computer used by the end user. For example, and an external storage device for recording and reproducing an information signal on and from the write once optical disk is connected to another external input and output terminal. Then, recorded data that had been read out from the read-only optical disk by the reproducing apparatus are all written in the write once optical disk by the external storage device, thereby producing a pirate edition of the read-only optical disk.

In this case, if the read-only optical-disk is a CD-ROM where computer data (including computer program) are recorded, then a pirate edition of game software can be easily produced. If the read-only optical disk is a compact disc (CD) where music information are recorded, then it becomes possible to easily produce a pirate edition of the compact disc.

Since computer programs are copyrighted material protected by copyright, copies—except those made by the regular user, i.e., registered users who accepted the software license agreement (software license agreement)—for backup or copies for the hard disk are illegal.

Further, copy for thoroughly copying recorded data on the CD-ROM which is a copyright material to the write once optical disk for the purpose of action of concession in distribution is also illegal and such illegal action for obtaining unfair profit should be prevented.

Furthermore, an act wherein a regular user makes a free distribution for those who are not regular users in an enterprise or CAI (Computer Assisted Instruction) is regarded as serious.

At present, there are a variety of proposed methods for copy protection many of which have been reduced to practice. On the other hand, a software (program or the like) called "copy tool" used in removing copy protection is now commercially available. Short of the user's own conscience, there is currently no other way to prevent the illegal copying of recorded data.

In view of the aforesaid, it is an object of the present invention to provide a data recording method wherein an illegal copy between disk-like recording mediums can be effectively protected even against a copy tool and in which copyrighted material (recorded data) recorded on the disk-like recording medium can be protected.

Interactive productions allow a user of a computer system to interact with movies, video or other displayed images while the images are being updated at a rapid rate. The purpose of these productions is to present useful information, educate or entertain the user. The ultimate goal of interactive technology is to make the user feel as though they are interacting with images on the screen so that, for example, characters or objects in a drama react to the users actions. The user's actions can affect characters, objects or other images on the display screen and change the course of the storyline.

One method for providing a high degree of interaction is to make the production completely computer generated. This means that the computer models a three dimensional world and calculates and displays the orientation of figures and objects on the screen. However, this approach is limited by today's technology because the computing power to fully calculate and render lifelike images, especially human figures, at resolutions approaching television quality in real time at video or film refresh rates is beyond the current technology for mass-marketed systems.

A different approach is to prerecord video, film or computer generated image sequences and play the prerecorded images, or frames, back at high speed. This achieves the resolution of television, or better, and is sufficiently lifelike to create a level of believability comparable to television. However, in this approach the user has a very limited amount of interactivity with the production since the user's ability to affect the story is limited to the small number of different "paths" of prerecorded image sequences that are branched to at predetermined decision points in the video or animation sequence. The use of any prerecorded sequences of images that are played back so as to achieve animation while allowing a user to interact with the images is referred to broadly here as "interactive video."

Interactive video productions typically use a compact disc read-only memory (CD-ROM) disc to store the images and a CD-ROM drive to retrieve images during playback. The CD-ROM disc stores information in a concentric spiral on optical media and is "read" or played back with a CD-ROM drive that uses a "read head" with a laser beam. The big problem with CD-ROM based interactive production is the break in continuity due to delays of about a half-second or more required to locate a desired branch path that is different from the current path that the drive's read head is tracking. Another problem is that CD-ROM based interactive video productions are severely limited in the number and types of ways that a user may interact with the video.

The length of time to access a different video path ("access time" or "seek time") depends upon the location of the different video path with respect to the current placement of the CD-ROM drive's read head. In order to access a given video sequence, a computer controller looks up the location of the sequence in an index and instructs the CD-ROM drive to access the new sequence by moving the read head to the beginning of the new sequence on the disc. Since the read head is moved by a mechanical mechanism it takes a comparatively long time to reposition the read head to a new point on the track to access the different video path.

The prior art uses caches to try to improve the performance of accessing data in a CD-ROM. The cache can be in the CD-ROM drive, in an interface card between the processor and the drive, in the memory of the computer system controlled by software or even on a hard disk or other storage medium. However, these caches only provide marginal improvement in access times where video is concerned because of the relatively small sizes of the caches compared to the data rate of the information coming off of the CD-ROM. Also, when a different path is branched to the information in the caches is usually useless since they don't contain the new data. The caches must be "purged" and loaded with new information.

While current CD-ROM drives are not adequate to provide sufficient interactivity in interactive video productions, they represent a huge installed base since hundreds of thousands have already been sold to consumers. Therefore, a system which eliminates the access time in CD-ROM based interactive videos without requiring modification of existing CD-ROM drives is desired.

Conventionally, a so-called LD (Laser Disk) and a so-called CD (Compact Disk) are generalized as optical disks, on which information such as video information, audio information and the like is recorded. On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. With respect to this DVD, if a plurality of subtitles in various languages or a plurality of voice sounds in various languages are recorded, the above mentioned interactive and variegated reproduction is possible as the audience selects one of them.

However, the information amount of the audio information or music information becomes enormous if the audio or voice sounds in various languages or the music in various types are recorded on the above-mentioned DVD. At this time, if the information is not recorded in an appropriate recording form, the process for searching the audio information etc. to be reproduced becomes complicated, and a case where the audio sound or music sound etc. is interrupted in the middle of the reproduction due to the time required to search the audio information etc. may happen at the time of reproduction, which is a problem.

It should be noted that the process operations used in the examples and figures above exemplify only a few implementations of the present invention. Those skilled in the art will appreciate that other process operations can accomplish the design goals of the present invention. For example, analogies may be drawn to digital entertainment systems. Likewise, alternative logic can be used to implement the present invention.

It should also be noted that all of the above embodiments pertain to multiple platforms or machines including, but not limited to computers, set-top boxes, DVD consumer players, cable boxes, and satellite receivers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is

1. A method of playing multimedia content comprising:
   reading, at a local machine, local multimedia content stored on a portable storage medium;
   determining whether a connection to a network is available;
   determining whether a control structure is stored at the local machine on a separate storage medium when the connection to the network is not available; and
   utilizing the control structure stored on the separate storage medium to alter the playback of the local multimedia content stored on the portable storage medium when the control structure is stored on the local machine.

2. The method of claim 1, further comprising:
   determining whether there is a first updated content stored on the local machine and whether the first updated content is relevant to the local multimedia content stored on the portable storage medium;
   accessing over the network a remote source when the connection to the network is available;
   communicating a version of the first updated content;
   receiving from the remote source a second updated content relevant to the local multimedia content that is a newer version of content than the first updated content stored at the local machine; and
   the utilizing the control structure to alter the playback of the local multimedia content comprises playing back the second updated content instead of the first updated content, in cooperation with the local multimedia content and playing back at least a portion of the second updated content in place of a portion of the local multimedia content.

3. The method of claim 1, further comprising:
   determining whether there is a first updated content stored on the local machine and whether the first updated content is relevant to the local multimedia content stored on the portable storage medium; and
   the utilizing the control structure to alter the playback of the local multimedia content comprises playing back the first updated content in cooperation with the local multimedia content when the first updated content is stored on the local machine and is relevant to the local multimedia content.

4. The method of claim 3, wherein the playing back of the first updated content comprises playing back at least a portion of the first updated content in place of a portion of the local multimedia content.

5. The method of claim 4, wherein the playing back at the portion of the first updated content in place of a portion of the local multimedia content comprises identifying the portion of the local multimedia content and evaluating the first updated content to determine whether one or more portions of the first updated content is specifically relevant to the identified portion of the local multimedia content.

6. The method of claim 3, further comprising:
   accessing over the network a remote source when the connection to the network is available;
   accessing a network control structure stored at the remote source where the network control structure is configured to alter the playback of the local multimedia content stored on the portable storage medium; and
   utilizing the network control structure accessed at the remote source in place of the control structure stored at the local machine on the separate storage medium to alter the playback of the local multimedia content stored on the portable storage medium when the connection to the network is available.

7. A method of playing multimedia content as recited in claim 1, further comprising determining if separate multimedia content is stored on the separate storage medium in response to the reading at the local machine of the local multimedia content;
   wherein the control structure modifies a flow of the local multimedia content.

8. A method of playing multimedia content as recited in claim 7, wherein the separate multimedia content is a subtitle.

9. A method of playing multimedia content as recited in claim 7, wherein the separate multimedia content is captions.

10. A method of playing multimedia content as recited in claim 7, wherein the separate multimedia content is a menu.

11. A method of playing multimedia content as recited in claim 7, wherein the separate multimedia content is an alternate camera angle.

12. A method of playing multimedia content as recited in claim 7, wherein the separate multimedia content further comprises programmatic content.

13. A method of playing multimedia content as recited in claim 12, wherein said programmatic content is at least one of markup language content and Java content.

14. A method of playing multimedia content as recited in claim 7, wherein the separate multimedia content is in a different language than said local multimedia content.

15. A method of playing multimedia content as recited in claim 7, wherein the separate multimedia content further comprises at least one of additional multimedia content, subtitle, captions, a menu, an alternate camera angle, a subpicture, and programmatic content.

16. A method of playing multimedia content as recited in claim 15, wherein said programmatic content is at least one of markup language content and Java content.

17. A method of playing multimedia content as recited in claim 15, wherein said additional multimedia content is in a different language than said local multimedia content.

18. A method of playing multimedia content as recited in claim 15, further comprising:
   receiving an indication of a user action, which is effected by the user; and
   wherein said determining further comprises determining as a function of said receiving of the indication of the user action.

19. A method of playing multimedia content as recited in claim 7, wherein said separate multimedia content is stored in a cache memory.

20. A method of playing multimedia content as recited in claim 7, wherein said separate multimedia content is stored in RAM.

21. A method of playing multimedia content as recited in claim 7, wherein said separate multimedia content is stored in a hard drive.

22. A method of playing multimedia content as recited in claim 1, further comprising:
   receiving an indication of a user action, which is affected by the user;
   wherein said determining further comprises determining as a function of said receiving of the indication of the user action.

23. A method of playing multimedia content as recited in claim 1, wherein the method farther comprises identifying said portable storage medium using a tracking identifier on said portable storage medium.

24. A method of playing multimedia content as recited in claim 23, wherein said tracking identifier is retrieved from the burst cut area (BCA).

25. A method of playing multimedia content as recited in claim 1, further comprising reading at said local machine a user identifier.

26. A method of playing multimedia content as recited in claim 25, wherein said determining is based upon said user identifier.

27. A method of playing multimedia content as recited in claim 1, further comprising reading at said local machine a unique identifier.

28. A method of playing multimedia content as recited in claim 1, wherein said control structure is based upon a user profile.

29. A method of playing multimedia content as recited in claim 1, wherein said control structure is downloaded.

30. A method of playing multimedia content as recited in claim 1 further comprising determining if separate multimedia content is stored on a separate storage medium based upon a version of the local multimedia content and downloading to the local machine a version of the separate multimedia content based upon the version of the local multimedia content.

31. A method of playing multimedia content as recited in claim 1 further comprising determining if separate multimedia content is stored on a separate storage medium based upon a playback location of the local multimedia content stored on a portable storage medium.

32. A method of playing multimedia content as recited in claim 31 wherein the playback time of the local multimedia content is the current playback location of the local multimedia content.

33. A method of providing multimedia content comprising the steps of:
reading, at a local machine, local multimedia content stored on a portable storage medium;
determining whether a network connection is available;
downloading, to the local machine, a first control structure to control the display of the local multimedia content when it is determined that the network connection is available.

34. The method of claim 33, further comprising:
utilizing the first control structure to display the local multimedia content stored on the portable storage medium;
accessing a remote source over the network when the network connection is available;
receiving, at the local machine, access rights from the remote source to access additional multimedia content stored on the portable storage medium that is not accessible to be displayed without the access rights; and
utilizing the first control structure to further display the additional multimedia content from the portable storage medium.

35. The method of claim 34, wherein the receiving the access rights comprises receiving the access rights only available based on a date relative to the portable storage medium.

36. The method of claim 33, further comprising:
accessing a secondary source over the network when the network connection is available;
receiving a first updated content from the secondary source of a plurality of updated contents accessible through the secondary source where the first updated content is relevant to a user profile associated with a user utilizing the local machine to access the secondary source.

37. The method of claim 36, further comprising:
receiving a second updated content from the secondary source of the plurality of updated contents accessible through the secondary source where the second updated content is relevant to a content owner of the local multimedia content stored on the portable storage medium.

38. The method of claim 37, further comprising:
utilizing the first control structure to alter the display of a first portion of the local multimedia content stored on the portable storage medium comprising displaying the first and second updated content in cooperation with displaying the first portion of local multimedia content;
accessing a remote source over the network when the network connection is available;
receiving, at the local machine, access rights from the remote source to access a second portion of the local multimedia content stored on the portable storage medium that is not accessible to be displayed without the access rights; and
utilizing the first control structure to further display the second portion of the local multimedia content when the access rights are received at the local machine.

39. The method of claim 33, further comprising:
determining, when it is previously determined that the network connection is not available, whether there is a first updated content stored in a separate storage medium at the local machine and whether the first updated content is relevant to the local multimedia content; and
utilizing a second control structure stored at the local machine to alter the display of the local multimedia content comprising displaying the first updated content in cooperation with the local multimedia content when the first updated content is stored on the local machine, the first updated content is relevant to the local multimedia content and the network connection is not available.

40. The method of claim 39, further comprising:
determining whether network accessible second updated content is relevant to the local multimedia content and is available from a network source accessible over the network connection when it is determined that the network connection is available;
downloading to the local machine the second updated content when it is determined that the network connection is available and the second updated content is available and relevant to the local multimedia content; and
the utilizing the first control structure comprises utilizing the first control structure to alter the display of the local multimedia content comprising displaying the second updated content, instead of the first updated content, in cooperation with the local multimedia content when the second updated content is downloaded to the local machine and is relevant to the local multimedia content.

41. The method of claim 33, further comprising:
determining whether network accessible second updated content that is relevant to the local multimedia content is available from a network source accessible over the network connection when it is determined that the network connection is available;
downloading to the local machine the second updated content when it is determined that the network connection is available and the second updated content is available and relevant to the local multimedia content; and
utilizing the first control structure to alter the display of the local multimedia content comprising utilizing the first control structure to display the second updated content in place of at least a portion of the local multimedia content in cooperation with the display of one or more other portions of the local multimedia content when the second updated content is downloaded to the local machine and is relevant to the local multimedia content.

42. A method of providing multimedia content as recited in claim 33, further comprising determining if separate multimedia content is stored on a separate storage medium in response to the reading at the local machine of the local multimedia content.

43. A method of providing multimedia content as recited in claim 42, wherein the separate multimedia content comprises one or more of captions, a menu, an alternate camera angle and programmatic content.

44. A method of providing multimedia content as recited in claim 43, wherein said programmatic content is at least one of markup language content and Java content.

45. A method of providing multimedia content as recited in claim 42, wherein the separate multimedia content is in a different language than said local multimedia content.

46. A method of providing multimedia content as recited in claim 42, further comprising:
receiving an indication of a user action, which is effected by the user;
wherein said determining further comprises determining as a function of said receiving of the indication of the user action.

47. A method of providing multimedia content as recited in claim 42, wherein the separate multimedia content further comprises additional multimedia content.

48. A method of providing multimedia content as recited in claim 47, wherein said additional multimedia content is a subtitle.

49. A method of providing multimedia content as recited in claim 47, wherein said additional multimedia content is captions.

50. A method of providing multimedia content as recited in claim 47, wherein said additional multimedia content further comprises a menu.

51. A method of providing multimedia content as recited in claim 47, wherein said additional multimedia content is an alternate camera angle.

52. A method of providing multimedia content as recited in claim 47, wherein said additional multimedia content is a subpicture.

53. A method of providing multimedia content as recited in claim 47, wherein said additional multimedia content further comprises programmatic content.

54. A method of providing multimedia content as recited in claim 53, wherein said programmatic content is at least one of markup language content and Java content.

55. A method of providing multimedia content as recited in claim 47, wherein said additional multimedia content is in a different language than said local multimedia content.

56. A method of providing multimedia content as recited in claim 47, further comprising:
receiving an indication of a user action, which is effected by the user; and
wherein said determining further comprises determining as a function of said receiving of the indication of the user action.

57. A method of providing multimedia content as recited in claim 42, wherein said separate multimedia content is stored in a cache memory.

58. A method of providing multimedia content as recited in claim 42, wherein said separate multimedia content is stored in RAM.

59. A method of providing multimedia content as recited in claim 42, wherein said separate multimedia content is stored in a hard drive.

60. A method of providing multimedia content as recited in claim 33, wherein the method further comprises identifying said portable storage medium using a tracking identifier on said portable storage medium.

61. A method of providing multimedia content as recited in claim 60, wherein said tracking identifier is retrieved from the burst cut area (BCA).

62. A method of providing multimedia content as recited in claim 33, further comprising reading at said local machine a user identifier.

63. A method of providing multimedia content as recited in claim 62, wherein said determining is based upon said user identifier.

64. A method of providing multimedia content as recited in claim 33, further comprising reading at said local machine a unique identifier.

65. A method of providing multimedia content as recited in claim 33, wherein the portable storage medium is an electronic storage medium.

66. A method of providing multimedia content as recited in claim 33, wherein the portable storage medium is an optical storage medium.

67. A method of providing multimedia content as recited in claim 33, wherein said control structure is stored in a cache memory.

68. A method of providing multimedia content as recited in claim 33, wherein said control structure is stored in RAM.

69. A method of providing multimedia content as recited in claim 33, wherein said control structure is stored in a hard drive.

70. A method of providing multimedia content as recited in claim 33, wherein said control structure is based upon a user profile.

71. A method of providing multimedia content as recited in claim 33, wherein said control structure is downloaded.

72. A method of providing multimedia content as recited in claim 33 further comprising determining if separate multimedia content is stored on a separate storage medium based upon a version of the local multimedia content.

73. A method of providing multimedia content as recited in claim 72 wherein a version of the separate multimedia content is downloaded based upon a version of the local multimedia content.

74. A method of providing multimedia content as recited in claim 33 further comprising determining if separate multimedia content is stored on a separate storage medium based upon a playback location of the local multimedia content stored on a portable storage medium.

75. A method of providing multimedia content as recited in claim 74 wherein the playback time of the local multimedia content is the current playback location of the local multimedia content.

76. A method comprising:
receiving a request for an indication of whether separate multimedia content is stored on a separate storage medium, the request having been generated in response to reading local multimedia content;
determining whether a first separate multimedia content is available that is directly associated with the local multimedia content and is a newer version of a portion of the local multimedia content;
transmitting the first separate multimedia content stored on the separate storage medium when the first separate multimedia content is a newer version of the portion of the local multimedia content; and transmitting a control structure to control the display of the first separate multimedia content in place of the portion of the local multimedia content.

77. A method of claim 76 wherein the received request includes a playback time of the local multimedia content.

78. A method of claim 77 wherein the playback time is the current playback time of the local multimedia content.

79. A method of claim 76 wherein the separate multimedia content is programmatic content.

80. A method of claim 79 wherein the programmatic content is at least one of markup language content and Java content.

81. A method of claim 79 wherein the programmatic content is web content.

82. A method of claim 76 wherein the received request includes a version of the local multimedia content.

83. A method of claim 82 wherein the separate multimedia content is a version compatible with a version of the local multimedia content.

84. The method of claim 76, further comprising:

determining whether a known error exists with the local multimedia content;

transmitting a second separate multimedia content retrieved from the separate storage medium such that the control structure controls the display of the second separate multimedia content in place of an additional portion of the local multimedia content containing the error.

85. The method of claim 76, further comprising:

accessing a user profile directly associated with a user transmitting the request;

determining whether a first updated multimedia content exists that is associated with the user profile; and transmitting the first updated multimedia content when the first updated multimedia content is associated with the user provide such that the control structure displays the first updated content in cooperation with the local multimedia content.

86. The method of claim 85, further comprising:

determining that a date has passed relative to the local multimedia content; and transmitting a second updated content that comprises access rights based on the local multimedia content when it is determined that the date has passed, wherein the access rights provide access to a previously inaccessible portion of the local multimedia content prior to the date and without the access rights.

87. The method of claim 76, further comprising:

determining that a time frame has expired relative to the local multimedia content; and transmitting a first updated content that comprises access rights based on the local multimedia content when the time frame has expired, wherein the access rights provide access by the control structure to display a previously inaccessible portion of the local multimedia content the was inaccessible prior to the expiration of the time frame and without the access rights.

\* \* \* \* \*

UNITED STATES PATENT AND TRADEMARK OFFICE
CERTIFICATE OF CORRECTION

PATENT NO. : 7,499,938 B2  
APPLICATION NO. : 10/957033  
DATED : March 3, 2009  
INVENTOR(S) : Collart Page 1 of 1

It is certified that error appears in the above-identified patent and that said Letters Patent is hereby corrected as shown below:

On the TITLE PAGE:  
Item (75), Inventor, delete "Todd Collart" and insert --Todd R. Collart--.  
In the CLAIMS:  
Claim 23, column 28, line 67, delete "farther" and insert --further--.

Signed and Sealed this

Twenty-third Day of June, 2009

JOHN DOLL  
*Acting Director of the United States Patent and Trademark Office*